United States Patent
Ren et al.

(10) Patent No.: US 12,549,328 B2
(45) Date of Patent: Feb. 10, 2026

(54) CODEWORD SYNCHRONIZATION METHOD, COMMUNICATION DEVICE, CHIP, AND CHIP SYSTEM

(71) Applicant: Huawei Technologies Co., Ltd., Shenzhen (CN)

(72) Inventors: Hao Ren, Beijing (CN); Xiang He, Beijing (CN); Xinyuan Wang, Beijing (CN)

(73) Assignee: HUAWEI TECHNOLGOIES CO., LTD., Shenzhen (CN)

( * ) Notice: Subject to any disclaimer, the term of this patent is extended or adjusted under 35 U.S.C. 154(b) by 0 days.

(21) Appl. No.: 18/787,001

(22) Filed: Jul. 29, 2024

(65) Prior Publication Data

US 2024/0388417 A1 Nov. 21, 2024

Related U.S. Application Data

(63) Continuation of application No. PCT/CN2022/138026, filed on Dec. 9, 2022.

(30) Foreign Application Priority Data

Jan. 30, 2022 (CN) .......................... 202210113601.8
May 12, 2022 (CN) .......................... 202210520888.6

(51) Int. Cl.
*H04L 25/00* (2006.01)
*H04L 7/04* (2006.01)
*H04L 7/10* (2006.01)

(52) U.S. Cl.
CPC ................ *H04L 7/048* (2013.01); *H04L 7/10* (2013.01)

(58) Field of Classification Search
CPC ......... H04L 7/10; H04L 7/048; H04L 1/0057; H04L 1/0061; H04L 1/0075;
(Continued)

(56) References Cited

U.S. PATENT DOCUMENTS

2007/0204204 A1* 8/2007 Sul ..................... H03M 13/6325
714/776
2009/0116470 A1* 5/2009 Berggren .............. H04W 56/00
455/422.1
(Continued)

FOREIGN PATENT DOCUMENTS

CA 3178683 A1 10/2021
CN 103004123 A 3/2013
(Continued)

OTHER PUBLICATIONS

IEEE Standard for Ethernet, IEEE Computer Society, IEEE 802.3-2018, Sponsored by the LAN/MAN Standards Committee, Jun. 14, 2018, total 5600 pages.
(Continued)

*Primary Examiner* — Khai Tran
(74) *Attorney, Agent, or Firm* — Conley Rose, P.C.

(57) ABSTRACT

A codeword synchronization method includes: entering a synchronization position determining state in response to a start signal; determining a synchronization position in a received data sequence in the synchronization position determining state, where the synchronization position indicates a start position of a codeword in the data sequence; entering a loss-of-lock detection state in response to determining the synchronization position; verifying, in the loss-of-lock detection state, a plurality of codewords selected based on the synchronization position; and re-entering the synchronization position determining state in response to a verification failure.

31 Claims, 15 Drawing Sheets

(58) Field of Classification Search
CPC .... H03M 13/333; H03M 13/33; H03M 13/05; H03M 5/145; H04W 52/0229; H04W 88/026
USPC ........................................................ 375/359
See application file for complete search history.

(56) References Cited

U.S. PATENT DOCUMENTS

| | | |
|---|---|---|
| 2009/0276681 A1 | 11/2009 | Ou et al. |
| 2016/0006561 A1 | 1/2016 | Radhakrishnan |
| 2016/0149595 A1 | 5/2016 | Benjamini et al. |
| 2016/0380714 A1 | 12/2016 | Liu et al. |
| 2024/0056218 A1* | 2/2024 | He .................... H04L 1/0057 |

FOREIGN PATENT DOCUMENTS

| | | |
|---|---|---|
| CN | 104885392 B | 11/2016 |
| CN | 110474718 A | 11/2019 |
| CN | 113517949 A | 10/2021 |
| CN | 115250162 A | 10/2022 |
| WO | 2012065497 A1 | 5/2012 |

OTHER PUBLICATIONS

CCSDS, "TM Synchronization and Channel Coding-Summary of concept and rationale", Informational Report CCSDS 130.1-G-3, Green Book, Jun. 2020, total 130 pages.

* cited by examiner

CODEWORD SYNCHRONIZATION METHOD, COMMUNICATION DEVICE, CHIP, AND CHIP SYSTEM

CROSS-REFERENCE TO RELATED APPLICATIONS

This is a continuation of International Patent Application No. PCT/CN2022/138026 filed on Dec. 9, 2022, which claims priority to Chinese Patent Application No. 202210113601.8 filed on Jan. 30, 2022 and Chinese Patent Application No. 202210520888.6 filed on May 12, 2022. All of the aforementioned patent applications are hereby incorporated by reference in their entireties.

TECHNICAL FIELD

The present disclosure relates to the field of communication technologies, and in particular, to a codeword synchronization method, a communication device, a chip, and a chip system.

BACKGROUND

Currently, with development of communication technologies, channel loss and noise have become key factors that limit a data transmission rate and distance. Forward error correction (FEC) provides error correction protection for data in transmission, thereby increasing a data transmission rate and transmission distance of a channel. The FEC involves a block code, and the block code includes a linear block code and a non-linear block code. The linear block code is widely applied at a physical layer and a media access control (MAC) sublayer of a data link layer in an Open System Interconnection (OSI) model of the Ethernet because of simple encoding and decoding of the linear block code.

Error detection and error correction functions of the linear block code need to be implemented based on a complete codeword. Therefore, a codeword boundary needs to be determined in a data sequence, that is, a start and an end of a complete codeword needs to be found. This process is referred to as codeword synchronization or frame synchronization.

Currently, a synchronization solution applicable to the linear block code is available in the industry. An alignment marker (AM) synchronization solution used in 200/400 Gigabit Ethernet (GE) in the 802.3 standard is used as an example. In this solution, a fixed AM sequence needs to be inserted at an interval of a codeword of a specific length, and a receiver can perform codeword synchronization by identifying the AM sequence. However, existence of the AM sequence is equivalent to insertion of additional data into a data stream sent by a transmitter, and therefore redundant information is added.

SUMMARY

The present disclosure provides a codeword synchronization method, a communication device, a chip, and a chip system, so that codeword synchronization can be implemented without inserting an AM, thereby saving transmission resources.

According to a first aspect, the present disclosure provides a codeword synchronization method. The method includes: entering a synchronization position determining state in response to a start signal; determining a synchronization position in a received data sequence in the synchronization position determining state, where the synchronization position indicates a start position of a codeword in the data sequence; entering a loss-of-lock detection state in response to determining the synchronization position; and verifying, in the loss-of-lock detection state, a plurality of codewords selected based on the synchronization position, and re-entering the synchronization position determining state in response to a verification failure.

In the solution in the present disclosure, the synchronization position determining state is entered in response to the start signal, and the synchronization position is determined in the synchronization position determining state. The loss-of-lock detection state is entered after the synchronization position is determined. In the loss-of-lock detection state, once it is determined that the synchronization position does not satisfy a verification condition, the synchronization position is re-determined. In this way, the synchronization method is a self-synchronization method, and codeword synchronization can be implemented without inserting an AM at a transmitter, thereby saving transmission resources. In addition, when the detected synchronization position is inaccurate, the synchronization position may be re-determined, so that continuous codeword synchronization can also be performed. In addition, a state machine is further used to implement the continuous codeword synchronization, so that the continuous codeword synchronization can be implemented more accurately.

In a possible implementation, the determining a synchronization position in a received data sequence in the synchronization position determining state includes: selecting N observation bits from the data sequence and determining the synchronization position based on positions of the N observation bits in the synchronization position determining state, where N is an integer greater than or equal to 1.

In the solution in the present disclosure, an observation bit belongs to the data sequence, and a position of the observation bit is a position that may be the synchronization position in the data sequence.

In a possible implementation, the determining the synchronization position based on positions of the N observation bits includes: selecting the synchronization position from the positions of the N observation bits.

In the solution in the present disclosure, the synchronization position may be directly determined from the positions of the N observation bits.

In a possible implementation, the synchronization position determining state includes a first counter reset substate and a first codeword verification substate; and the selecting N observation bits from the data sequence and selecting the synchronization position from the positions of the N observation bits in the synchronization position determining state includes: setting an initial value of a first codeword counter in the first counter reset substate, and selecting one observation bit from the data sequence; entering the first codeword verification substate in response to selecting one first test block from the data sequence based on the current observation bit, where a length of the first test block is equal to a codeword length, and a start position of the first test block and a position of the current observation bit are separated by an integer quantity of codeword lengths; verifying the first test block in the first codeword verification substate; increasing a count value of the first codeword counter by X in response to the first test block satisfying a verification condition, where X is an integer greater than or equal to 1; and determining the position of the current observation bit as the synchronization position in response to the count value of the first codeword counter being equal to a first threshold.

In the solution in the present disclosure, in test blocks selected by using the current observation bit, first-threshold contiguous test blocks satisfy the verification condition, and the position of the current observation bit is determined as the synchronization position. In this way, the synchronization position can be quickly determined due to a relatively small quantity of states of a state machine.

In a possible implementation, the selecting N observation bits from the data sequence and selecting the synchronization position from the positions of the N observation bits in the synchronization position determining state further includes: in response to the count value of the first codeword counter being less than the first threshold, re-entering the first codeword verification substate, and verifying a next first test block selected based on the current observation bit.

In a possible implementation, the synchronization position determining state further includes a first codeword valid substate; and the increasing a count value of the first codeword counter by X in response to the first test block satisfying a verification condition includes: entering the first codeword valid substate in response to the first test block satisfying the verification condition; and increasing the count value of the first codeword counter by X in the first codeword valid substate.

In a possible implementation, the selecting N observation bits from the data sequence and selecting the synchronization position from the positions of the N observation bits in the synchronization position determining state further includes: verifying, in response to the first test block not satisfying the verification condition, a next observation bit selected from the data sequence.

In the solution in the present disclosure, after the first test block is selected based on the current observation bit, if the first test block does not satisfy the verification condition, it indicates that the position of the current observation bit is not the synchronization position, and whether the next observation bit is the synchronization position continues to be determined. In this way, the synchronization position can be quickly determined.

In a possible implementation, the synchronization position determining state further includes a first slip substate; and the verifying, in response to the first test block not satisfying the verification condition, a next observation bit selected from the data sequence includes: entering the first slip substate in response to the first test block not satisfying the verification condition; slipping to the next observation bit in the first slip substate; and in response to slipping to the next observation bit, re-entering the first counter reset substate, and verifying the next observation bit.

In the solution in the present disclosure, when the first test block does not satisfy the verification condition, the first slip substate is entered, slip processing is performed to slip to the next observation bit, and the first counter reset substate is re-entered.

In a possible implementation, the synchronization position determining state further includes a first synchronization lock initialization substate; and before the setting an initial value of a first codeword counter in the first counter reset substate, the method further includes: setting a value of a first synchronization lock variable to a first value in the first synchronization lock initialization substate.

In a possible implementation, the synchronization position determining state further includes a first synchronization lock success substate; and the determining the position of the current observation bit as the synchronization position in response to the count value of the first codeword counter being equal to a first threshold includes: entering the first synchronization lock success substate in response to the count value of the first codeword counter being equal to the first threshold; and setting the value of the first synchronization lock variable to a second value in the first synchronization lock success substate, where that the value of the first synchronization lock variable is the second value indicates that the position of the current observation bit is the synchronization position.

In a possible implementation, the method further includes: setting a value of a first codeword to-be-verified variable to a third value in the first synchronization lock initialization substate; and the entering the first codeword verification substate in response to selecting one first test block from the data sequence based on the current observation bit includes: setting the value of the first codeword to-be-verified variable to a fourth value in response to selecting the one first test block from the data sequence based on the current observation bit; and entering the first codeword verification substate in response to the value of the first codeword to-be-verified variable being the fourth value and the value of the first synchronization lock variable being the first value.

In a possible implementation, the loss-of-lock detection state includes a second codeword verification substate; and the verifying, in the loss-of-lock detection state, a plurality of codewords selected based on the synchronization position includes: re-entering the first counter reset substate in response to determining the synchronization position; entering the second codeword verification substate in response to selecting one first codeword based on the synchronization position; and verifying the first codeword in the second codeword verification substate.

In a possible implementation, the verifying, in the loss-of-lock detection state, a plurality of codewords selected based on the synchronization position further includes: setting the initial value of the first codeword counter and an initial value of a first invalid codeword counter in the first counter reset substate; and the re-entering the synchronization position determining state in response to a verification failure includes: increasing the count value of the first codeword counter by Y and increasing a count value of the first invalid codeword counter by Z in response to the first codeword not satisfying the verification condition, where both Y and Z are integers greater than or equal to 1; and re-entering the synchronization position determining state in response to the count value of the first invalid codeword counter being equal to a third threshold in a case in which the count value of the first codeword counter is less than or equal to a second threshold, where the third threshold is less than the second threshold.

In the solution in the present disclosure, a synchronization position determining process and a loss-of-lock detection process can share some states, so that a process of implementing continuous codeword synchronization can be simplified.

In a possible implementation, the synchronization position determining state includes the first slip substate; and the re-entering the synchronization position determining state includes: entering the first slip substate; slipping to the next observation bit in the first slip substate; and in response to slipping to the next observation bit, re-entering the first counter reset substate, and verifying the next observation bit.

In a possible implementation, the determining the synchronization position based on positions of the N observation bits includes: selecting a candidate position in the data sequence from the positions of the N observation bits; and determining the synchronization position based on the candidate position.

In the solution in the present disclosure, a position that is most likely to be the synchronization position, that is, the candidate position, may be first selected from the positions of the N observation bits, and then the synchronization position is determined by using the candidate position, so that the determined synchronization position is more accurate.

In a possible implementation, N is greater than 1, and the synchronization position determining state includes a second counter reset substate and a third codeword verification substate; and the selecting N observation bits from the data sequence and selecting a candidate position in the data sequence from the positions of the N observation bits in the synchronization position determining state includes: setting an initial value of a second codeword counter and an initial value of a first currently-valid codeword counter in the second counter reset substate, and selecting one observation bit from the data sequence; entering the third codeword verification substate in response to selecting one second test block from the data sequence based on the current observation bit, where a length of the second test block is equal to a codeword length, and a start position of the second test block and a position of the current observation bit are separated by an integer quantity of codeword lengths; verifying the second test block in the third codeword verification substate; increasing a count value of the second codeword counter by W, where W is an integer greater than or equal to 1; and increasing a count value of the first currently-valid codeword counter by P in response to the second test block satisfying a verification condition, where P is an integer greater than or equal to 1; increasing a value of an observation bit quantity variable by 1 in response to the count value of the second codeword counter being equal to a fourth threshold, and in response to the count value of the first currently-valid codeword counter being greater than a current value of a maximum valid codeword quantity variable, updating a value of a candidate synchronization position variable to the position of the current observation bit, and updating the current value of the maximum valid codeword quantity variable to the count value of the first currently-valid codeword counter; and determining the value of the current candidate synchronization position variable as the candidate position in response to the value of the observation bit quantity variable being equal to N.

In the solution in the present disclosure, verification is continuously performed on the N observation bits, an observation bit corresponding to a largest quantity of test blocks that satisfy the verification condition in the N observation bits is selected, and a position of the observation bit is determined as the candidate position. In this way, because each observation bit is verified to select the candidate position, the determined candidate position may be more accurate, in other words, the determined candidate position is more likely to be the synchronization position.

In a possible implementation, the synchronization position determining state further includes a candidate position selection substate; and the increasing a value of an observation bit quantity variable by 1 in response to the count value of the second codeword counter being equal to a fourth threshold, and in response to the count value of the first currently-valid codeword counter being greater than a current value of a maximum valid codeword quantity variable, updating a value of a candidate synchronization position variable to the position of the current observation bit, and updating the current value of the maximum valid codeword quantity variable to the count value of the first currently-valid codeword counter includes: entering the candidate position selection substate in response to the count value of the second codeword counter being equal to the fourth threshold; and in the candidate position selection substate, increasing the value of the observation bit quantity variable by 1 in response to the count value of the second codeword counter being equal to the fourth threshold, and in response to the count value of the first currently-valid codeword counter being greater than the current value of the maximum valid codeword quantity variable, updating the value of the candidate synchronization position variable to the position of the current observation bit, and updating the current value of the maximum valid codeword quantity variable to the count value of the first currently-valid codeword counter.

In a possible implementation, the selecting N observation bits from the data sequence and selecting a candidate position in the data sequence from the positions of the N observation bits in the synchronization position determining state further includes: verifying, in response to the value of the observation bit quantity variable being less than N, a next observation bit selected from the data sequence.

In a possible implementation, the synchronization position determining state further includes a second slip substate; and the verifying, in response to the value of the observation bit quantity variable being less than N, a next observation bit selected from the data sequence includes: entering the second slip substate in response to the value of the observation bit quantity variable being less than N; slipping to the next observation bit in the second slip substate; and in response to slipping to the next observation bit, re-entering the second counter reset substate, and verifying the next observation bit.

In a possible implementation, the synchronization position determining state further includes a second synchronization lock initialization substate; and before the setting an initial value of a second codeword counter and an initial value of a first currently-valid codeword counter in the second counter reset substate, the method further includes: in the second synchronization lock initialization substate, setting the value of the observation bit quantity variable to a fifth value, setting the value of the candidate synchronization position variable to a sixth value, and setting the value of the maximum valid codeword quantity variable to a seventh value.

In a possible implementation, the method further includes: setting a value of a second codeword to-be-verified variable to a third value in the second synchronization lock initialization substate; and the entering the third codeword verification substate in response to selecting one second test block from the data sequence based on the current observation bit includes: setting the value of the second codeword to-be-verified variable to a fourth value in response to selecting the one second test block from the data sequence based on the current observation bit; and entering the third codeword verification substate in response to the value of the second codeword to-be-verified variable being the fourth value.

In a possible implementation, the selecting N observation bits from the data sequence and selecting a candidate position in the data sequence from the positions of the N observation bits in the synchronization position determining state further includes: in response to the count value of the second codeword counter being less than the fourth threshold, re-entering the third codeword verification substate, and verifying a next second test block selected based on the current observation bit.

In a possible implementation, the synchronization position determining state includes a third counter reset substate and a fourth codeword verification substate; and the selecting N observation bits from the data sequence and selecting a candidate position in the data sequence from the positions of the N observation bits in the synchronization position determining state includes: setting an initial value of a third codeword counter and an initial value of a first valid codeword counter in the third counter reset substate, and selecting one observation bit from the data sequence; entering the fourth codeword verification substate in response to selecting one third test block from the data sequence based on the current observation bit, where a length of the third test block is equal to a codeword length, and a start position of the third test block and a position of the current observation bit are separated by an integer quantity of codeword lengths; verifying the third test block in the fourth codeword verification substate; increasing a count value of the third codeword counter by M and increasing a count value of the first valid codeword counter by Q in response to the third test block satisfying a verification condition, where both M and Q are integers greater than or equal to 1; and determining the position of the current observation bit as the candidate position in response to the count value of the first valid codeword counter being equal to a sixth threshold in a case in which the count value of the third codeword counter is less than or equal to a fifth threshold, where the fifth threshold is greater than or equal to the sixth threshold.

In the solution in the present disclosure, the N observation bits are sequentially verified, and when a quantity of test blocks that satisfy the verification condition reaches a specific quantity in test blocks selected based on a specific observation bit, a position of the observation bit is determined as the candidate position. In this manner, it is possible that verification does not need to be performed on all observation bits, so that the candidate position can be quickly determined.

In a possible implementation, the synchronization position determining state further includes a second codeword valid substate; and the increasing a count value of the third codeword counter by M and increasing a count value of the first valid codeword counter by Q in response to the third test block satisfying a verification condition includes: entering the second codeword valid substate in response to the third test block satisfying the verification condition; and increasing the count value of the third codeword counter by M and increasing the count value of the first valid codeword counter by Q in the second codeword valid substate.

In a possible implementation, the selecting N observation bits from the data sequence and selecting a candidate position in the data sequence from the positions of the N observation bits in the synchronization position determining state further includes: in the second codeword valid substate, in response to the count value of the third codeword counter being equal to the fifth threshold and the count value of the first valid codeword counter being less than the sixth threshold, verifying a next observation bit selected from the data sequence.

In a possible implementation, the selecting N observation bits from the data sequence and selecting a candidate position in the data sequence from the positions of the N observation bits in the synchronization position determining state further includes: in the second codeword valid substate, in response to the count value of the third codeword counter being less than the fifth threshold and the count value of the first valid codeword counter being less than the sixth threshold, re-entering the fourth codeword verification substate, and verifying a next third test block selected based on the current observation bit.

In a possible implementation, the synchronization position determining state further includes a first codeword invalid substate; and the selecting N observation bits from the data sequence and selecting a candidate position in the data sequence from the positions of the N observation bits in the synchronization position determining state further includes: entering the first codeword invalid substate in response to the third test block not satisfying the verification condition; increasing the count value of the third codeword counter by M in the first codeword invalid substate; and verifying, in response to the count value of the third codeword counter being equal to the fifth threshold, the next observation bit selected from the data sequence.

In a possible implementation, the selecting N observation bits from the data sequence and determining a candidate position in the data sequence based on the N observation bits in the synchronization position determining state further includes: in the first codeword invalid substate, in response to the count value of the third codeword counter being less than the fifth threshold, re-entering the fourth codeword verification substate, and verifying the next third test block selected based on the current observation bit.

In a possible implementation, the synchronization position determining state further includes a third slip substate; and the verifying a next observation bit selected from the data sequence includes: entering the third slip substate; slipping to the next observation bit in the third slip substate; and in response to slipping to the next observation bit, re-entering the third counter reset substate, and verifying the next observation bit.

In a possible implementation, the synchronization position determining state further includes a third synchronization lock initialization substate; and before the setting an initial value of a third codeword counter and an initial value of a first valid codeword counter in the third counter reset substate, the method further includes: setting a value of a third codeword to-be-verified variable to a third value in the third synchronization lock initialization substate.

In a possible implementation, the entering the fourth codeword verification substate in response to selecting one third test block from the data sequence based on the current observation bit includes: setting the value of the third codeword to-be-verified variable to a fourth value in response to selecting the one third test block from the data sequence based on the current observation bit; and entering the fourth codeword verification substate in response to the value of the third codeword to-be-verified variable being the fourth value.

In a possible implementation, the determining the synchronization position based on the candidate position includes: verifying the candidate position, and determining the candidate position as the synchronization position after the verification succeeds.

In the solution in the present disclosure, the candidate position is verified after the candidate position is selected, and the candidate position is determined as the synchronization position after the verification succeeds. Because the verification is further performed on the candidate position, the determined synchronization position can be more accurate.

In a possible implementation, the synchronization position determining state further includes a fourth counter reset substate and a fifth codeword verification substate; and the verifying the candidate position, and determining the candidate position as the synchronization position after the verification succeeds includes: setting an initial value of a fourth codeword counter in the fourth counter reset substate, and selecting one fourth test block from the data sequence based on the candidate position; entering the fifth codeword verification substate in response to selecting the one fourth test block from the data sequence based on the candidate position; verifying the fourth test block in the fifth codeword verification substate; increasing a count value of the fourth codeword counter by R in response to the fourth test block satisfying the verification condition, where R is an integer greater than or equal to 1; and determining the candidate position as the synchronization position in response to the count value of the fourth codeword counter being equal to a seventh threshold.

In the solution in the present disclosure, the fourth test blocks selected based on the candidate position are sequentially verified, and when a quantity of fourth test blocks that satisfy the verification condition reaches a specific quantity, the candidate position is determined as the synchronization position. In this manner, whether the candidate position is the synchronization position can be determined.

In a possible implementation, the synchronization position determining state further includes a third codeword valid substate; and the increasing a count value of the fourth codeword counter by R in response to the fourth test block satisfying the verification condition includes: entering the third codeword valid substate in response to the fourth test block satisfying the verification condition; and increasing the count value of the fourth codeword counter by R in the third codeword valid substate.

In a possible implementation, the verifying the candidate position, and determining the candidate position as the synchronization position after the verification succeeds further includes: in response to the count value of the fourth codeword counter being less than the seventh threshold, re-entering the fifth codeword verification substate, and verifying a next fourth test block selected based on the candidate position.

In a possible implementation, the verifying the candidate position, and determining the candidate position as the synchronization position after the verification succeeds further includes: reselecting a candidate position in response to the fourth test block not satisfying the verification condition.

In the solution in the present disclosure, provided that one fourth test block does not satisfy the verification condition, the candidate position is reselected, so that the selected candidate position can be more likely to be the synchronization position.

In a possible implementation, the synchronization position determining state further includes a first re-synchronization substate; and the reselecting a candidate position in response to the fourth test block not satisfying the verification condition includes: entering the first re-synchronization substate in response to the fourth test block not satisfying the verification condition; and setting a value of a first re-synchronization lock variable to a second value in the first re-synchronization substate, where that the value of the first re-synchronization lock variable is the second value indicates to re-select the candidate position in the data sequence.

In a possible implementation, the synchronization position determining state further includes a second synchronization lock success substate; and the determining the candidate position as the synchronization position in response to the count value of the fourth codeword counter being equal to a seventh threshold includes: entering the second synchronization lock success substate in response to the count value of the fourth codeword counter being equal to the seventh threshold; and setting a value of a second synchronization lock variable to the second value in the second synchronization lock success substate, where that the value of the second synchronization lock variable is the second value indicates that the candidate position is the synchronization position.

In a possible implementation, the determining the synchronization position based on the candidate position includes: determining the candidate position as the synchronization position.

In the solution in the present disclosure, the candidate position is directly determined as the synchronization position, so that the synchronization position can be quickly determined.

In a possible implementation, the verifying, in the loss-of-lock detection state, a plurality of codewords selected based on the synchronization position, and re-entering the synchronization position determining state in response to a verification failure includes: verifying, in the loss-of-lock detection state, a codeword in a codeword set selected based on the synchronization position, where the codeword set includes a target quantity of codewords; and re-entering the synchronization position determining state in response to a quantity of codewords that do not satisfy the verification condition in the codeword set reaching an eighth threshold.

In the solution in the present disclosure, after the synchronization position is selected, whether the synchronization position is correct is continuously determined, so that continuous codeword synchronization can be performed. In addition, whether a quantity of codewords that do not satisfy the verification condition reaches a specific value is determined, and the quantity of codewords that do not satisfy the verification condition is relatively small. Therefore, whether the synchronization position is accurate is determined based on the quantity of codewords that do not satisfy the verification condition, so that whether the synchronization position is correct can be more quickly determined.

In a possible implementation, the loss-of-lock detection state includes a fifth counter reset substate and a sixth codeword verification substate; and the verifying, in the loss-of-lock detection state, a codeword in a codeword set selected based on the synchronization position, where the codeword set includes a target quantity of codewords; and re-entering the synchronization position determining state in response to a quantity of codewords that do not satisfy the verification condition in the codeword set reaching an eighth threshold includes: setting an initial value of a fifth codeword counter and an initial value of a second invalid codeword counter in the fifth counter reset substate; entering the sixth codeword verification substate in response to selecting one second codeword from the data sequence based on the synchronization position; verifying the second codeword in the sixth codeword verification substate; increasing a count value of the fifth codeword counter by 1 and increasing a count value of the second invalid codeword counter by 1 in response to the second codeword not satisfying the verification condition; and re-entering the synchronization position determining state in response to the count value of the second invalid codeword counter being equal to the eighth threshold in a case in which the count value of the fifth codeword counter is less than a target value.

In the solution in the present disclosure, after the synchronization position is selected, whether the synchronization position is correct is continuously determined, so that continuous codeword synchronization can be performed.

In a possible implementation, the loss-of-lock detection state further includes a second codeword invalid substate; and the increasing a count value of the fifth codeword counter by 1 and increasing a count value of the second invalid codeword counter by 1 in response to the second codeword not satisfying the verification condition includes: entering the second codeword invalid substate in response to the second codeword not satisfying the verification condition; and increasing the count value of the fifth codeword counter by 1 and increasing the count value of the second invalid codeword counter by 1 in the second codeword invalid substate.

In a possible implementation, the verifying, in the loss-of-lock detection state, a codeword in a codeword set selected based on the synchronization position, where the codeword set includes a target quantity of codewords; and re-entering the synchronization position determining state in response to a quantity of codewords that do not satisfy the verification condition in the codeword set reaching an eighth threshold further includes: increasing the count value of the fifth codeword counter by 1 in response to the second codeword satisfying the verification condition; and in response to the count value of the fifth codeword counter being equal to the target value, re-entering the fifth counter reset substate, and performing next verification on the synchronization position.

In a possible implementation, the loss-of-lock detection state further includes a fourth codeword valid substate; and the increasing the count value of the fifth codeword counter by 1 in response to the second codeword satisfying the verification condition includes: entering the fourth codeword valid substate in response to the second codeword satisfying the verification condition; and increasing the count value of the fifth codeword counter by 1 in the fourth codeword valid substate.

In a possible implementation, the verifying, in the loss-of-lock detection state, a codeword in a codeword set selected based on the synchronization position, where the codeword set includes a target quantity of codewords; and re-entering the synchronization position determining state in response to a quantity of codewords that do not satisfy the verification condition in the codeword set reaching an eighth threshold further includes: in the third codeword valid substate, in response to the count value of the fifth codeword counter being less than the target value, re-entering the sixth codeword verification substate, and verifying a next second codeword selected based on the synchronization position.

In a possible implementation, the verifying, in the loss-of-lock detection state, a codeword in a codeword set selected based on the synchronization position, where the codeword set includes a target quantity of codewords; and re-entering the synchronization position determining state in response to a quantity of codewords that do not satisfy the verification condition in the codeword set reaching an eighth threshold further includes: in the second codeword invalid substate, in response to the count value of the fifth codeword counter being less than the target value and the count value of the second invalid codeword counter being less than the eighth threshold, re-entering the sixth codeword verification substate, and verifying the next second codeword selected based on the synchronization position.

In a possible implementation, the verifying, in the loss-of-lock detection state, a codeword in a codeword set selected based on the synchronization position, where the codeword set includes a target quantity of codewords; and re-entering the synchronization position determining state in response to a quantity of codewords that do not satisfy the verification condition in the codeword set reaching an eighth threshold further includes: in the second codeword invalid substate, in response to the count value of the fifth codeword counter being equal to the target value and the count value of the second invalid codeword counter being less than the eighth threshold, re-entering the fifth counter reset substate, and performing next verification on the synchronization position.

In a possible implementation, the verification condition is that a quantity of zero elements in a syndrome of a test block or a codeword is greater than a synchronization threshold; or the verification condition is that a quantity of non-zero elements in a syndrome of a test block or a codeword is less than a non-synchronization threshold; or the verification condition is that a test block or a codeword is an error correction test block; or the verification condition is that a re-parity bit of a test block or a codeword is the same as an original parity bit.

In the solution in the present disclosure, verification may be performed on the test block or the codeword in a plurality of manners, so that the test block and the codeword are more flexibly verified.

In a possible implementation, the start signal includes a system reset or start signal, a data reception failure signal, or a re-synchronization signal.

In a possible implementation, the data sequence is a bit stream that is encoded through FEC. In this way, the codeword synchronization method may be applied to the bit stream that is encoded through the FEC.

According to a second aspect, the present disclosure provides a codeword synchronization apparatus. The apparatus includes: a synchronization position determining module configured to: enter a synchronization position determining state in response to a start signal; and determine a synchronization position in a received data sequence in the synchronization position determining state, where the synchronization position indicates a start position of a codeword in the data sequence; and a loss-of-lock detection module configured to: enter a loss-of-lock detection state in response to determining the synchronization position; and verify, in the loss-of-lock detection state, a plurality of codewords selected based on the synchronization position, and re-enter the synchronization position determining state in response to a verification failure.

According to a third aspect, the present disclosure provides a communication device. The communication device includes a processor and a memory. The memory stores at least one computer instruction. The computer instruction is loaded and executed by the processor to implement the codeword synchronization method according to the first aspect or the possible implementations of the first aspect.

According to a fourth aspect, the present disclosure provides a chip. The chip is configured to implement the codeword synchronization method according to the first aspect or the possible implementations of the first aspect.

According to a fifth aspect, the present disclosure provides a chip system. The chip system includes a first chip and a second chip that are cascaded. The first chip is configured to implement the codeword synchronization method according to the first aspect or the possible implementations of the first aspect. The second chip is configured to perform codeword synchronization based on an AM mode.

DESCRIPTION OF EMBODIMENTS

To make objectives, technical solutions, and advantages of the present disclosure clearer, the following further describes implementations of the present disclosure in detail with reference to the accompanying drawings.

The following explains and describes some terms and concepts in embodiments of the present disclosure.

1. Codeword synchronization: The codeword synchronization means a process of determining a start position and an end position of a complete codeword in a data sequence. The data sequence may also be referred to as a data stream or a bit stream, and the codeword synchronization may also be referred to as frame synchronization.

2. State machine: finite state machine (FSM) in full name. The state machine is a mathematical model obtained by extracting and abstracting operations required for implementing a specific function. The state machine splits all operations required for function implementation into a finite quantity of associated states. Each state includes one or more sub-operations. Transition between states is triggered by a change of an input signal or a specific parameter. The specific parameter is stored in a register and is considered as a register variable. The state machine can be in only one state at any moment.

When the state machine is implemented by hardware, the state machine includes a combinational logic circuit and a register. The combinational logic circuit is configured to perform an operation, and the register is configured to store a register variable.

Figure 1:
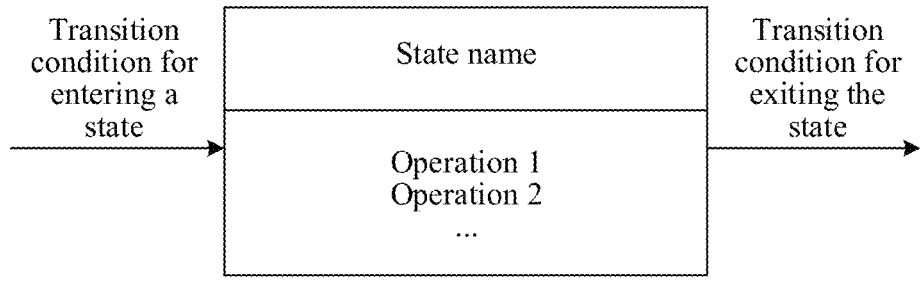
FIG. 1 is a diagram of a principle of a state machine according to an example embodiment of the present disclosure.

The state machine is expressed in a plurality of manners, and a state diagram (or state transition diagram) is common because of intuitiveness. In the state diagram, each state is represented by using a rectangle and is divided into two parts by a horizontal line in the rectangle, the upper part is a state name, and the lower part is an operation that needs to be performed in this state. The transition between states is represented by using a unidirectional arrow, a text description on the arrow indicates a condition that needs to be satisfied for the transition, and the condition is referred to as a transition condition. FIG. 1 provides an example of a single state and conditions for entering and exiting the state. When a state machine enters one state, operations in the state are first performed, then it is detected whether a transition condition is satisfied, and a next corresponding state is entered if the transition condition is satisfied.

In FIG. 1, the state is represented by using a rectangle. This is merely an example herein. The state may alternatively be represented by using another shape such as a circle, and state transition may alternatively be represented by using another arrow or form. This is not limited in embodiments of the present disclosure.

The following describes the background of the present disclosure.

Due to impact of signal loss and noise, an error occurs when a signal is transmitted on a channel, affecting reliability of a communication system. When the signal is represented in a form of a data sequence including a plurality of bits, the transmission error is specifically embodied as a change in values of some bits in the data sequence, that is, a bit error occurs. FEC is a technology for controlling a transmission error in a communication system. In the FEC technology, redundant information is sent together with an original data sequence to recover an error during transmission and reduce a bit error rate. The FEC may be classified into a block code and a convolutional code based on different data sequence processing modes. The block code may be further sub-classified into a linear block code and a non-linear block code. A systematic code in the linear block code is used as an example. A transmitter groups an original data sequence. A length of each group is k bits. In each group, redundant information of n-k bits is added according to a specific encoding rule, and the redundant information is referred to as a parity bit. Finally, a codeword with a length of n bits is obtained. Both n and k are integers. In this way, in the codeword with the length of n bits, the first k bits are original data and are also referred to as information bits, and the last n-k bits are parity bits. A complete codeword includes an information bit and a parity bit. After a codeword is transmitted from the transmitter to a receiver through a channel, if a quantity of error bits in the codeword is within an error correction range, the receiver may check and correct the error bits through decoding, and recover the received codeword to original data sent by the transmitter, thereby reducing interference caused by the channel and improving reliability of the communication system. Error detection and error correction functions of a linear block codeword need to be implemented based on the complete codeword. Therefore, before a data sequence received by the receiver is decoded, a boundary of the codeword needs to be determined in the data sequence, that is, a start position and an end position of the complete codeword need to be found. This process is referred to as codeword synchronization or frame synchronization. If the codeword synchronization is incorrect, that is, a correct start position is not determined, an error detection or error correction effect cannot be achieved in a subsequent decoding process, and even a bit error rate may be increased, causing performance deterioration of the communications system. It can be learned that the codeword synchronization is critical.

Figure 2:
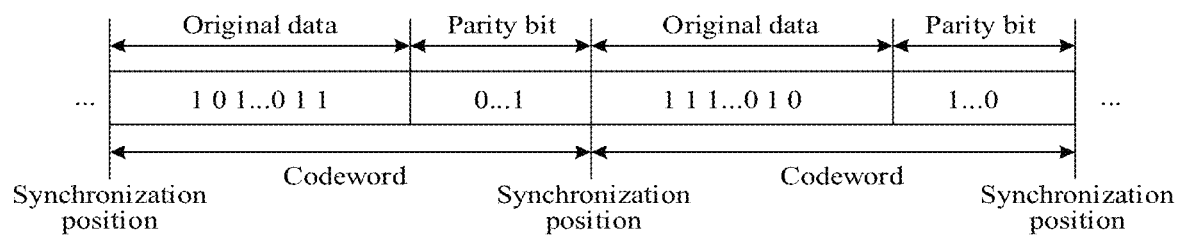
FIG. 2 is a diagram of a codeword and a synchronization position according to an example embodiment of the present disclosure.

A systematic code is used as an example. FIG. 2 provides a synchronization position of a codeword. As shown in FIG. 2, a length of the entire codeword is n bits, where the first k bits are original data, the last n-k bits are parity bits, and a synchronization position in a data sequence is a start position of the codeword, that is, a position of a $1^{st}$ bit in the codeword. In the data sequence, there are a plurality of synchronization positions, and the plurality of synchronization positions are associated with each other. In other words, an interval between adjacent synchronization positions is fixed, and the interval is equal to the length of the codeword, which is referred to as a codeword length.

In embodiments of the present disclosure, although the following uses the systematic code as an example for description, the present disclosure is not limited to the systematic code, and is also applicable to a non-systematic code. The present disclosure is applicable to all communication systems with linear block codes. The linear block code includes but is not limited to a Reed-Solomon (RS) code, a Bose-Chaudhuri-Hocquenghem (BCH) code, a low-density parity-check (LDPC) code, a Hamming code, a Golay code, a Reed-Muller code, and the like.

The following describes a hardware apparatus and an application scenario in embodiments of the present disclosure.

Embodiments of the present disclosure are applicable to a communication device performing FEC, such as a router, a switch, or a server.

The following provides three application scenarios that are implemented with reference to a physical layer of an Ethernet standard. For example, in a two-level cascaded FEC scenario, the RS code in the Ethernet standard is used as a cascaded outer FEC (FEC1). Because an AM solution is already used in the Ethernet standard to perform receiver RS-FEC codeword synchronization, a codeword synchronization solution in embodiments of the present disclosure may be applied to inner FEC (FEC2) of the two-level cascaded FEC. The inner FEC may also be referred to as first FEC, and the outer FEC may also be referred to as second FEC.

Figure 3:
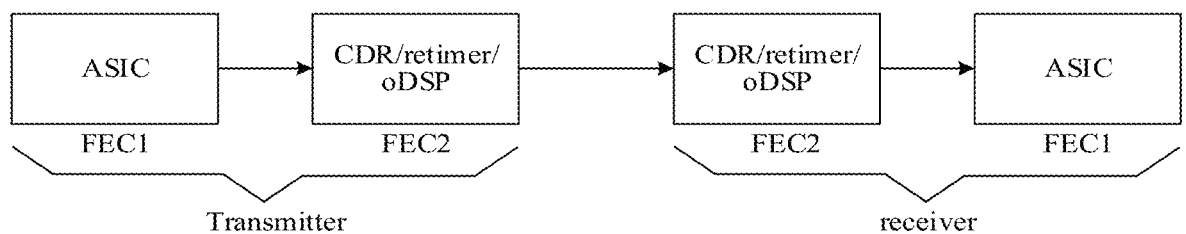
FIG. 3 is a diagram of an application scenario according to an example embodiment of the present disclosure.

In an application scenario 1, the two-level cascaded FEC is located in different chips. A chip in which FEC1 is located may use a transmit-end structure and a receive-end structure that are defined in an existing standard, and codeword synchronization is performed by using the AM solution during decoding. Referring to FIG. 3, at the transmitter and the receiver, FEC1 is usually integrated into an application-specific integrated circuit (ASIC), and codeword synchronization is performed during decoding by using the AM solution; and FEC2 is usually integrated into a clock and data recovery (CDR), a retimer, an optical digital signal processor (oDSP), or the like, and codeword synchronization is performed during decoding by using the solution in embodiments of the present disclosure. The application scenario 1 is usually a long-distance or high-rate transmission scenario, and FEC2 needs to be used on a relay node to enhance an error correction capability. Herein, when the relay node is an oDSP, a link may transmit an optical signal.

Figure 4:
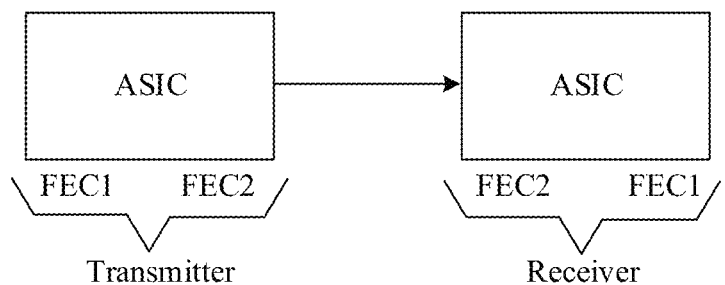
FIG. 4 is a diagram of an application scenario according to an example embodiment of the present disclosure.

In an application scenario 2, the two-level cascaded FEC is located in a same chip at both the transmitter and the receiver. Referring to FIG. 4, at the transmitter and the receiver, FEC1 is integrated into an ASIC, and codeword synchronization is performed during decoding by using the AM solution; and FEC2 is integrated into the ASIC, and codeword synchronization is performed during decoding by using the codeword synchronization solution in embodiments of the present disclosure. In the application scenario 2, a physical unit of FEC2 is additionally added to the transmit-end chip and the receive-end chip.

Figure 5:
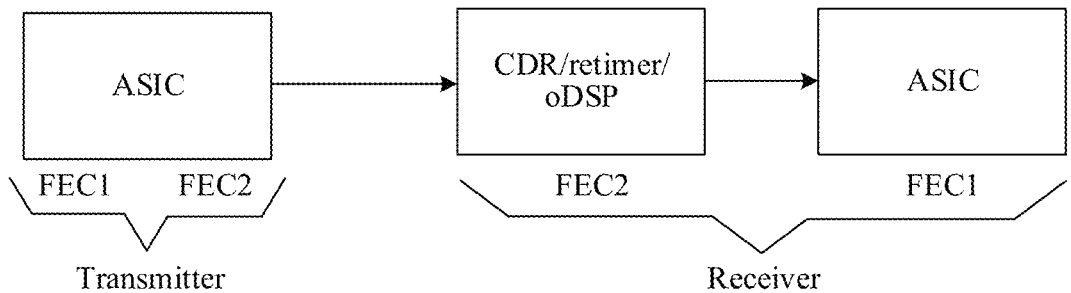
FIG. 5 is a diagram of an application scenario according to an example embodiment of the present disclosure.
Figure 6:
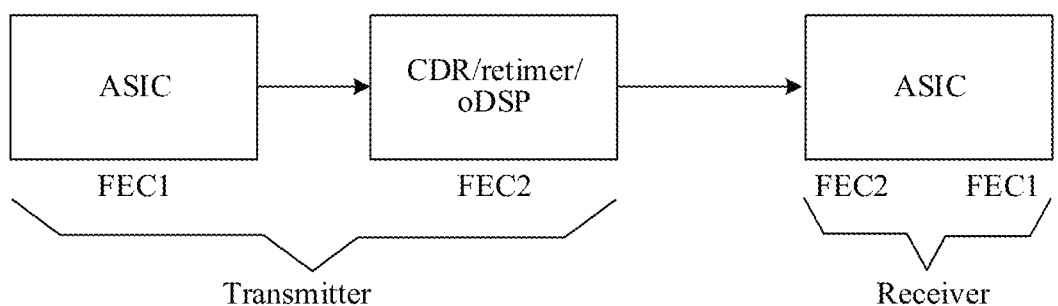
FIG. 6 is a diagram of an application scenario according to an example embodiment of the present disclosure.

In an application scenario 3, the two-level cascaded FEC is located in a same chip at one end of the transmitter and the receiver and is located in different chips at the other end. In FEC1, codeword synchronization is performed during decoding by using the AM solution; and in FEC2, codeword synchronization is performed during decoding by using the codeword synchronization solution in embodiments of the present disclosure. In the application scenario 3, a physical unit of FEC2 is added to the one end at which the two-level cascaded FEC is located in the same chip, FEC1 at the other end still uses the transmit-end structure or the receive-end structure defined in the Ethernet standard, and FEC2 is integrated into a CDR, a retimer, an oDSP, or the like. Referring to FIG. 5, at the transmitter, FEC1 and FEC2 are integrated into an ASIC; and at the receiver, FEC1 is integrated into the ASIC, and FEC2 is integrated into the CDR, the retimer, or the oDSP. Referring to FIG. 6, at the transmitter, FEC1 is integrated into an ASIC, and FEC2 is integrated into the CDR, the retimer, or the oDSP; and at the receiver, FEC1 and FEC2 are integrated into the ASIC.

It should be noted that the three application scenarios are described by using the two-level cascaded FEC as an example. The codeword synchronization solution in embodiments of the present disclosure may alternatively be applied to a multi-level cascaded FEC scenario, and may be applied not only to an inner FEC technology, but also to a technology of each-layer FEC. This is not limited in embodiments of the present disclosure.

In addition, this embodiment of the present disclosure may alternatively be applied to a non-cascaded FEC scenario. In other words, both the transmitter and the receiver perform FEC once, and the codeword synchronization solution in embodiments of the present disclosure may also be applied to the FEC once.

The following describes a procedure of a method for implementing codeword synchronization based on a state machine in an embodiment of the present disclosure.

Figure 7:
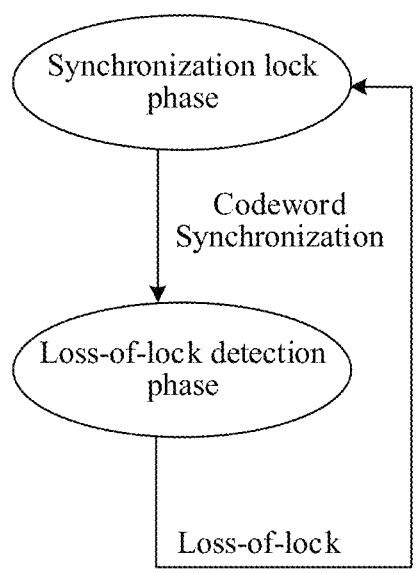
FIG. 7 is a schematic logical diagram of codeword synchronization according to an example embodiment of the present disclosure.

In this embodiment of the present disclosure, the complete synchronization procedure includes two phases: synchronization lock phase and loss-of-lock detection phase, to form a closed loop, so that a receive side of the communication system is in a synchronization lock state as much as possible, as shown in FIG. 7. For example, in the synchronization lock phase, a synchronization position is determined; and in the loss-of-lock detection phase, whether the synchronization position is accurate is continuously determined, and the synchronization position is re-determined when the synchronization position is incorrect.

In this embodiment of the present disclosure, each state is represented by using a rectangle and is divided into two parts by a horizontal line in the rectangle, the upper part is a state name, and the lower part is an operation that needs to be performed in this state. The representation of the state is merely an example. This is not limited in embodiments of the present disclosure. In text descriptions, { } indicates a name of a single state, and [ ] indicates a name of a register variable. In a state diagram, "+" indicates logical OR, "*" indicates logical AND, "!" indicates logical NOT, "<=" indicates that a value of a right variable is assigned to a left variable, and "++" indicates that a value of a register variable stored in a register is increased by 1. UCT means unconditional transition.

Figure 8:
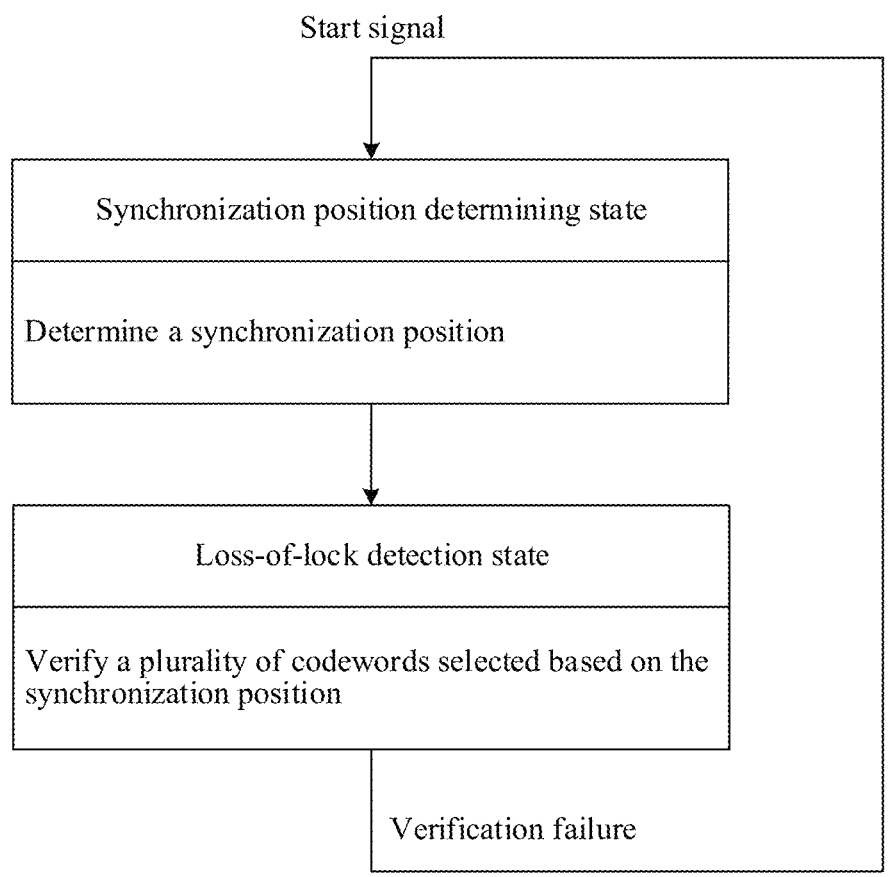
FIG. 8 is a flowchart of a method for implementing codeword synchronization based on a state machine according to an example embodiment of the present disclosure.

FIG. 8 is a flowchart of a method according to an embodiment of the present disclosure. The method is applied to a communication device in a communication network, and is specifically a receiver device configured to receive data. The communication device may be various devices performing FEC, and includes but is not limited to a router, a switch, a server, and the like. The method includes step 801 to step 804.

Step 801: Enter a synchronization position determining state in response to detecting a start signal.

In this embodiment, during synchronization position determining, after [start signal] is detected, unconditional transition is triggered to enter {synchronization position determining state}.

For example, [start signal] includes a system reset signal, a system start signal, a data reception failure signal, or a re-synchronization signal. The system reset signal indicates that a part used for decoding in a receiver is reconfigured. The system start signal indicates that a part used for decoding in the receiver is started. For example, the system start signal is detected when a data sequence is received. The data reception failure signal indicates a decoding failure at the receiver. The re-synchronization signal indicates that a synchronization position is re-determined.

Herein, the system reset signal, the system start signal, a system receive signal, and the re-synchronization signal are all register variables, and are respectively represented as [system reset signal], [system start signal], [system receive signal], and [re-synchronization signal].

Step 802: A state machine determines a synchronization position in a data sequence in the synchronization position determining state, where the synchronization position indicates a start position of a codeword in the data sequence.

The data sequence is received from a transmitter. The data sequence includes a plurality of bits, and each bit is binary data. The data sequence may also be referred to as a bit sequence. The data sequence uses a linear block code. When the data sequence is transmitted through a channel, a bit error may exist, and error detection, error correction, and other operations need to be performed.

In this embodiment, the state machine determines the synchronization position in the data sequence in {synchronization position determining state}, where the synchronization position is the start position of the codeword in the data sequence.

Step 803: The state machine enters a loss-of-lock detection state in response to determining the synchronization position.

The loss-of-lock detection state is a state of the state machine, and is represented as {loss-of-lock detection state}.

Step 804: The state machine verifies, in the loss-of-lock detection state, a plurality of codewords selected based on the synchronization position, and updates the synchronization position in response to a verification failure.

According to the solution in the present disclosure, codeword synchronization of the data sequence sent by the transmitter can be implemented at the receiver without inserting an additional overhead bit into the data sequence, and synchronization reliability is high. In addition, after the synchronization position is determined, a loss-of-lock detection mechanism is further used to determine whether the synchronization position is accurate, thereby further improving synchronization reliability.

For step 802, a synchronization position determining process is specifically as follows:

N observation bits are selected from the data sequence and the synchronization position is determined based on positions of the observation bits in {synchronization position determining state}, where N is an integer greater than or equal to 1. A position of a specific observation bit may be the synchronization position. There are a plurality of observation bit selection manners. The following provides three possible implementations.

In an implementation, the N observation bits are selected from the data sequence. When N is greater than 1, intervals between adjacent observation bits in a plurality of observation bits are the same.

In another implementation, in a codeword synchronization process, a concept of a test block is introduced. The test block belongs to a data sequence, and the test block includes a plurality of bits. A length of the test block is the same as a codeword length. It may be considered that each test block simulates one codeword. When N is greater than 1, the N observation bits may be located in one test block, and positions of the N observation bits in the one test block sequentially move backward. For example, a quantity of the N observation bits is equal to a test block length, in other words, positions of all bits in a single test block are traversed by traversing the positions of the N observation bits. Because traversing the positions of all the bits in the single test block may be considered as traversing positions of all bits in a single codeword, the determined synchronization position may be more accurate. However, as the quantity of observation bits increases, resources consumed in the codeword synchronization process also increase. For another example, a quantity of the N observation bits is less than a test block length, and one observation bit may be selected every M bits in the test block, where M is an integer greater than or equal to 1, M is less than n, and n is a quantity of bits included in a codeword.

In still another implementation, positions of the N observation bits in each test block sequentially move backward. For example, one bit is selected as an observation bit every L*n+M bits, where L is a quantity of test blocks at an interval, L is an integer greater than or equal to 1, and a test block length is n, that is, the test block includes n bits. When the observation bits are selected in this manner, an interval between adjacent observation bits is relatively large, and correlation between observation bits is lower, so that impact caused by a burst bit error can be reduced, thereby further improving codeword synchronization accuracy. Herein, a quantity of observation bits is less than or equal to n. When the quantity of observation bits is equal to n, because a position of a $1^{st}$ bit in each of a plurality of test blocks is considered as an equivalent position and a position of an $i^{th}$ bit is considered as an equivalent position, when the quantity of observation bits is equal to n, all equivalent positions may be traversed by traversing the positions of the N observation bits, so that all positions in the plurality of test blocks can be traversed by traversing the N observation bits, where i is greater than 1 and less than or equal to n.

For example, the following provides two possible implementations of determining the synchronization position based on the positions of the observation bits.

In an implementation, the synchronization position is selected from the positions of the N observation bits.

In this implementation, a principle of selecting the synchronization position is: sequentially selecting observation bits; continuously selecting a plurality of test blocks based on one observation bit selected each time; and if the plurality of test blocks all satisfy a verification condition for a specific observation bit, determining a position of the observation bit as the synchronization position, where positions of the plurality of test blocks in the data sequence may be contiguous or non-contiguous. For ease of description, the test block is referred to as a first test block in this implementation. A quantity of the plurality of test blocks may be set based on an empirical value, or may be set based on a simulation analysis result. In this embodiment of the present disclosure, that a test block satisfies the verification condition means that the test block is an acceptable block codeword, and that a test block does not satisfy the verification condition means that the test block is not an acceptable block codeword. Herein, the test block is an acceptable block codeword, and is considered as an acceptable block codeword based on a current verification manner.

Figure 9:
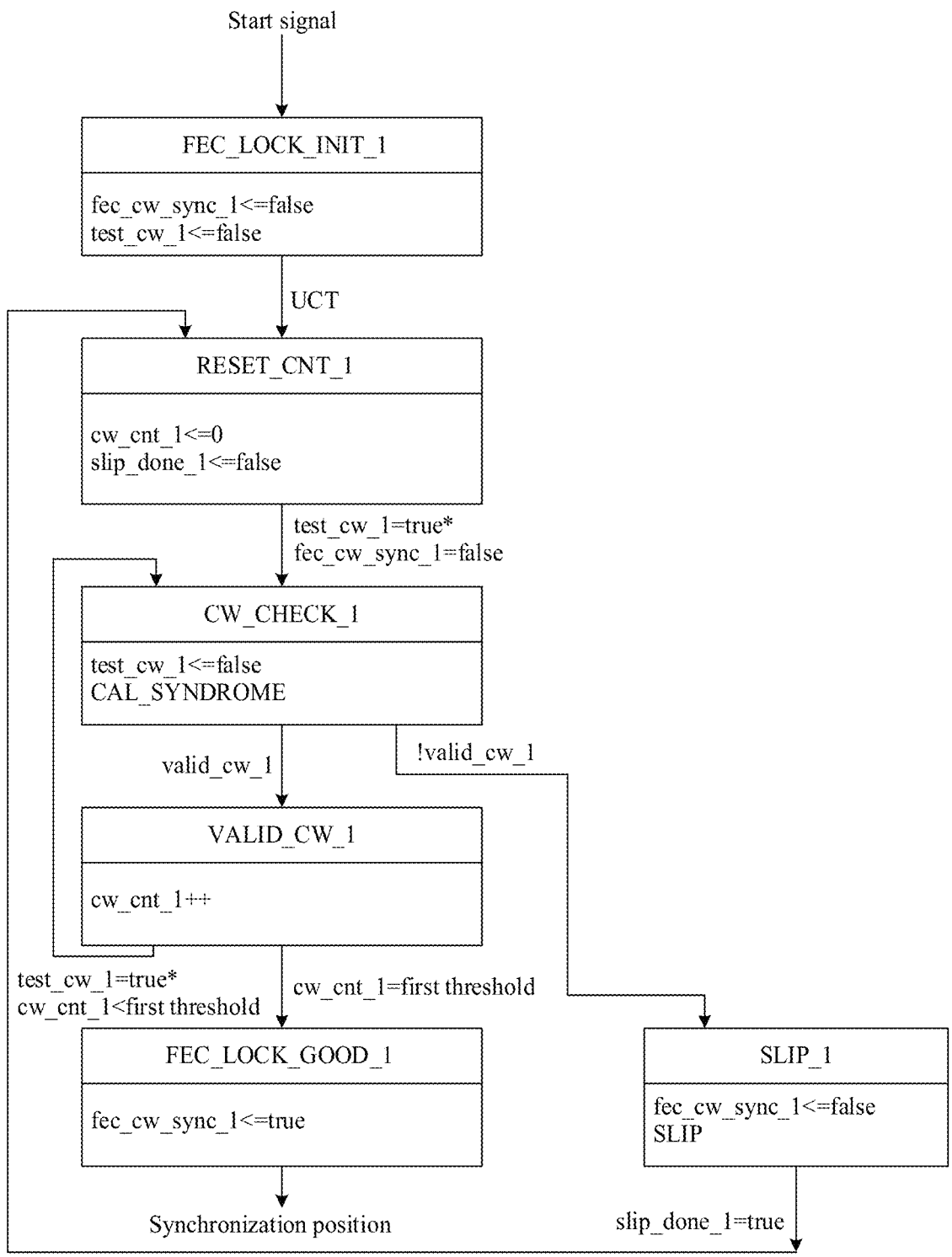
FIG. 9 is a state diagram of determining a synchronization position according to an example embodiment of the present disclosure.

Specifically, FIG. 9 is a diagram of implementing codeword synchronization. As shown in FIG. 9, {synchronization position determining state} includes {first counter reset substate} and {first codeword verification substate}, where {first counter reset substate} is a state in which a counter required in a codeword synchronization process is reset, and {first codeword verification substate} is a state in which a test block is verified. A processing manner of selecting the synchronization position based on the positions of the N observation bits is as follows:

An initial value of [first codeword counter] is set in {first counter reset substate}, where the initial value may be 0 or another value. One observation bit is selected from the received data sequence, and one first test block is selected from the data sequence based on the observation bit. A start position of the first test block and a position of the current observation bit are separated by an integer quantity of codeword lengths. For an observation bit selection manner, refer to the foregoing descriptions.

{first codeword verification substate} is entered in response to selecting the one first test block; the first test block is verified in {first codeword verification substate}; and a count value of [first codeword counter] is increased by X in response to the first test block satisfying a verification condition, where X is a value greater than or equal to 1.

A value relationship between the count value of [first codeword counter] and a first threshold is determined, and a position of the current observation bit is determined as the synchronization position in response to the count value of [first codeword counter] being equal to the first threshold.

When X is equal to 1, the first threshold is a quantity of first test blocks selected based on the observation bit. When X is greater than 1, the first threshold is X times the quantity of first test blocks selected based on the observation bit.

Optionally, in response to the count value of [first codeword counter] being less than the first threshold, a next first test block is selected based on the current observation bit, a next first test block is selected from the data sequence based on the current observation bit, and the next first test block is verified. Herein, selecting a next first test block based on the current observation bit means sequentially selecting first test blocks from the data sequence from front to back. Intervals between adjacent first test blocks may be equal or may not be equal, and positions of the adjacent first test blocks in the data sequence may be adjacent or may not be adjacent.

Optionally, {synchronization position determining state} further includes {first codeword valid substate}. {first codeword valid substate} is entered in response to the first test block satisfying the verification condition. The count value of [first codeword counter] is increased by X in {first codeword valid substate}.

Optionally, a value of [first codeword valid variable] is set to a second value in response to the first test block satisfying the verification condition; and {first codeword valid substate} is entered in response to the value of [first codeword valid variable] being the second value.

Optionally, in response to the first test block not satisfying the verification condition, a next observation bit is selected from the data sequence, and the next observation bit is verified. Verification manners of all observation bits are the same. Herein, the observation bits are sequentially selected, that is, observation bits continuously selected twice sequentially move backward in the data sequence.

Optionally, {synchronization position determining state} further includes {first slip substate}, and {first slip substate} is a state in which an observation bit is slipped to. {first slip substate} is entered in response to the first test block not satisfying the verification condition. The next observation bit in the data sequence is slipped to in {first slip substate}. The slip operation may be implemented by using a slip function. In response to slipping to the next observation bit, {first counter reset substate} is entered, and the next observation bit is verified.

Optionally, a value of [first slip completion variable] is set to true or another value after the next observation bit is slipped to; and {first counter reset substate} is entered in response to the value of [first slip completion variable] being true or the another value indicating slip completion.

The value of [first slip completion variable] is set to false or another value each time in {first counter reset substate}.

Optionally, a value of [first codeword valid variable] is set to a first value in response to the first test block not satisfying the verification condition; and {first slip substate} is entered in response to the value of [first codeword valid variable] being the first value.

Optionally, {synchronization position determining state} further includes {first synchronization lock initialization substate}, and {first synchronization lock initialization substate} is a synchronization start state.

{first synchronization lock initialization substate} is entered in response to detecting [start signal]; and a value of [first synchronization lock variable] is set to a first value in {first synchronization lock initialization substate}, where the first value may be false, 0, or the like.

Optionally, after the value of [first synchronization lock variable] is set to the first value in {first synchronization lock initialization substate}, {first counter reset substate} is entered through unconditional transition.

Optionally, a value of [first codeword to-be-verified variable] is set to a third value in {first synchronization lock initialization substate}, where the third value may be false, 0, or the like; the value of [first codeword to-be-verified variable] is set to a fourth value after the one first test block is selected, where the fourth value may be true, 1, or the like; {first codeword verification substate} is entered in response to the value of [first codeword to-be-verified variable] being the fourth value and the value of [first synchronization lock variable] being the first value; and the value of [first codeword to-be-verified variable] is set to the third value when {first codeword verification substate} is entered.

Optionally, in a case in which {synchronization position determining state} further includes {first synchronization lock initialization substate}, the value of [first synchronization lock variable] is set to a second value in response to the count value of [first codeword counter] being equal to the first threshold, where the second value may be true, 1, or the like. If the value of [first synchronization lock variable] is the second value, it indicates that the position of the current observation bit is the synchronization position.

Optionally, in a case in which {synchronization position determining state} further includes {first synchronization lock initialization substate}, {synchronization position determining state} further includes {first synchronization lock success substate}, and {first synchronization lock success substate} is a state in which synchronization is completed.

{first synchronization lock success substate} is entered in response to the count value of [first codeword counter] being equal to the first threshold. A value of [first synchronization lock variable] is set to a second value in {first synchronization lock success substate}, where the second value may be true, 1, or the like. If the value of [first synchronization lock variable] is the second value, it indicates that the position of the current observation bit is the synchronization position.

Optionally, whether the first test block satisfies the verification condition may be determined based on an characteristic value of the first test block. The characteristic value of the first test block includes a syndrome, a re-parity (parity) bit, or error correction. If a corresponding characteristic value is a syndrome, a verification function may be a computer syndrome (CAL_SYNDROME) function. If a corresponding characteristic value is a re-parity bit, a verification function may be a compare re-parity bit (COMPARE_PARITY) function. If a corresponding characteristic value is error correction, a verification function may be an error correction (ERROR_CORRECTION) function. The verification function shown in FIG. 9 is the CAL_SYNDROME function.

For example, when the characteristic value of the first test block is the syndrome, it is determined whether a quantity of zero elements in the syndrome is greater than a synchronization threshold; and if the quantity of zero elements is greater than the synchronization threshold, it is determined that the first test block satisfies the verification condition, that is, the first test block is an acceptable block codeword; otherwise, it is determined that the first test block does not satisfy the verification condition, that is, the first test block is not an acceptable block codeword. Alternatively, it is determined whether a quantity of non-zero elements in the syndrome is less than a non-synchronization threshold; and if the quantity of non-zero elements is less than the non-synchronization threshold, it is determined that the first test block satisfies the verification condition, that is, the first test block is an acceptable block codeword; otherwise, it is determined that the first test block does not satisfy the verification condition, that is, the first test block is not an acceptable block codeword.

When the characteristic value of the first test block is the re-parity bit, it is determined whether the re-parity bit is the same as an original parity bit; and if the re-parity bit is the same as the original parity bit, it may be determined that the first test block satisfies the verification condition, that is, the first test block is an acceptable block codeword; otherwise, it is determined that the first test block does not satisfy the verification condition, that is, the first test block is not an acceptable block codeword.

When the characteristic value of the first test block is the error correction, it is determined whether the first test block can be corrected by a decoding algorithm; and if the first test block can be corrected by the decoding algorithm, it is determined that the first test block satisfies the verification condition, that is, the first test block is an acceptable block codeword; otherwise, it is determined that the first test block does not satisfy the verification condition, that is, the first test block is not an acceptable block codeword.

It should be noted that the foregoing three possible verification manners each can be used for test block verification, or two or all of the foregoing three possible verification manners can be used for test block verification. In addition, verification may alternatively be performed in another manner. This is not limited in embodiments of the present disclosure.

A principle of verifying that a test block satisfies the verification condition to determine a position of an observation bit as the synchronization position is as follows:

For each linear block codeword, a check matrix may be generated. The check matrix describes a linear relationship between data in the linear block codeword, and the check matrix may be applied to a decoding process. When the data sequence is a linear block codeword, the data sequence also has a check matrix, which may be referred to as a check matrix of the data sequence. Specifically, for a relationship between the data sequence and the check matrix of the data sequence, refer to Formula (1).

$$S = C \cdot H^T = \vec{0} \qquad (1)$$

In Formula (1), C is a codeword in the data sequence, S is a syndrome of the codeword, and H is the check matrix of the data sequence. It can be learned from Formula (1) that the syndrome of the codeword in the data sequence is obtained by multiplying a transposed matrix of the check matrix of the data sequence, and the syndrome is a zero vector.

When the data sequence is a data sequence received by the receiver, a start position of a codeword is determined in the data sequence. If the codeword is selected from the data sequence without using a correct start position, the obtained codeword does not satisfy Formula (1). In this case, a syndrome of the codeword in the data sequence may be represented by Formula (2).

$$S_R = R \cdot H^T \quad (2)$$

In Formula (2), R is the codeword in the data sequence received by the receiver, SR is the syndrome of the codeword, and H is a check matrix of an original data sequence sent by the transmitter. The syndrome of the codeword in the data sequence received by the receiver is a product of the codeword and a transposed matrix of the check matrix of the original data sequence sent by the transmitter. It can be learned from Formula (1) and Formula (2) that Sp is not an all-zero matrix when the codeword includes an error bit. In this way, a syndrome of a first test block in the data sequence received by the receiver may be used to determine whether the first test block satisfies the verification condition.

In the state diagram shown in FIG. 9, {first synchronization lock initialization substate} is represented as FEC_LOCK_INIT_1, {first counter reset substate} is represented as RESET_CNT_1, {first codeword verification substate} is represented as CW_CHECK_1, {first slip substate} is represented as SLIP_1, and {first synchronization lock success substate} is represented as FEC_LOCK_GOOD_1. [first synchronization lock variable] is represented as fec_cw_sync_1, [first codeword to-be-verified variable] is represented as test_cw_1, the count value of [first codeword counter] is represented as cw_cnt_1, the value of [first codeword valid variable] is represented as valid_cw_1 when being set to the second value, the value of [first codeword valid variable] is represented as !valid_cw_1 when being set to the first value, and [first slip completion variable] is represented as slip_done_1.

Another principle of selecting the synchronization position is: traversing the N observation bits, and determining the synchronization position in the positions of the N observation bits. For example, the N observation bits are traversed, fourth-threshold test blocks are continuously selected based on each observation bit, and a quantity of test blocks that satisfy the verification condition in the fourth-threshold test blocks is determined, where positions of the fourth-threshold test blocks in the data sequence may be contiguous or non-contiguous. A position of an observation bit corresponding to a largest quantity of test blocks that satisfy the verification condition is determined as the synchronization position, or a position of an observation bit corresponding to a smallest quantity of test blocks that do not satisfy the verification condition is determined as the synchronization position. Herein, the fourth threshold is a value obtained when W is equal to 1 below. The fourth threshold may be set based on an empirical value, or may be set based on a simulation analysis result.

Figure 11:
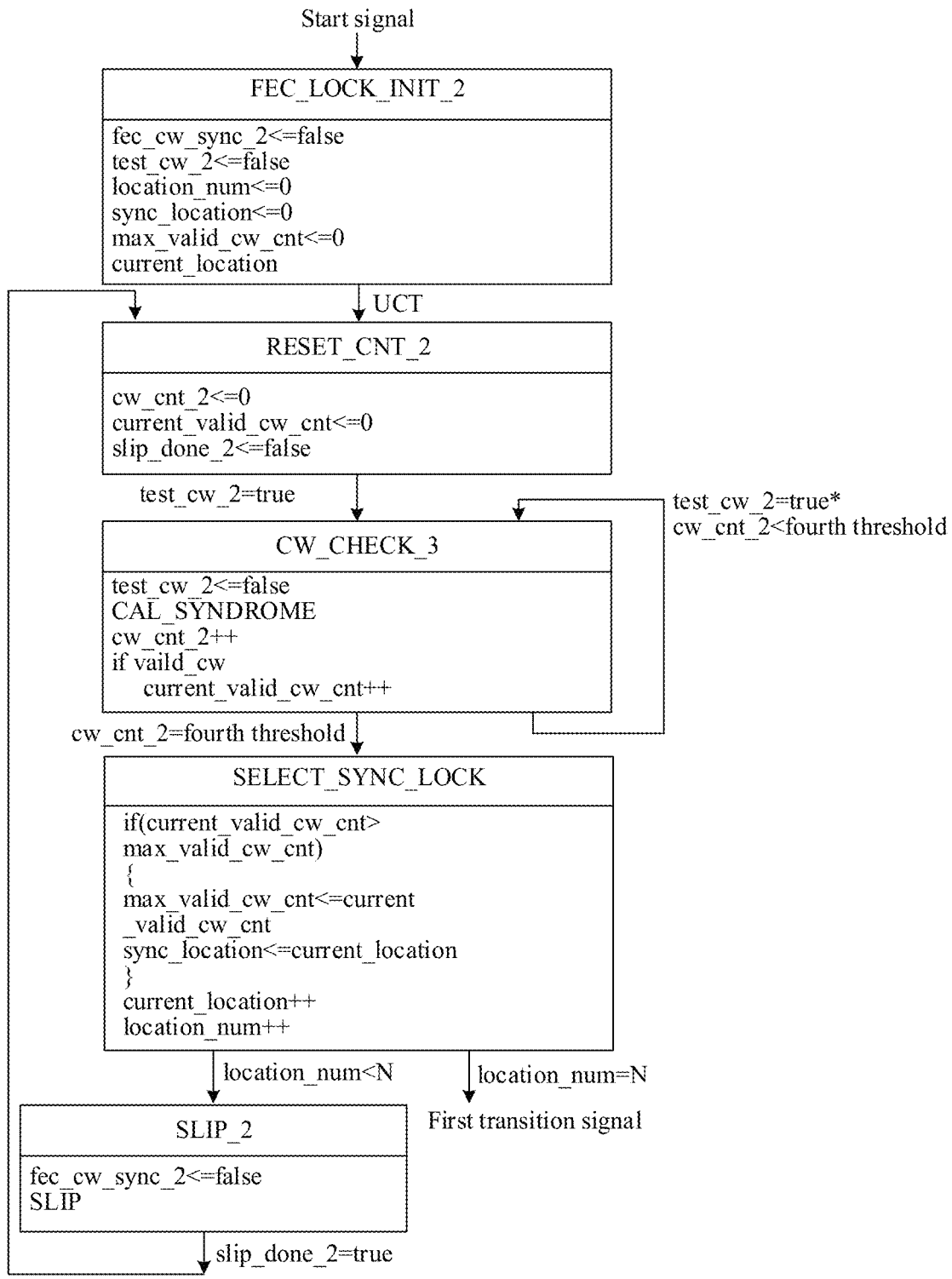
FIG. 11 is a state diagram of determining a candidate position according to an example embodiment of the present disclosure.

Specifically, for the state diagram of determining the synchronization position, refer to the descriptions in FIG. 11 below. This is equivalent to that a signal that is output in FIG. 11 is a second transition signal. The second transition signal is used to trigger to enter {loss-of-lock detection state}.

Still another principle of selecting the synchronization position is: starting from a 1st observation bit, sequentially verifying whether all observation bits satisfy a synchronization condition, where the synchronization condition may be that at least sixth-threshold test blocks satisfy the verification condition in fifth-threshold test blocks continuously selected based on the observation bit, positions of the fifth-threshold test blocks in the data sequence may be contiguous or non-contiguous, and positions of the sixth-threshold test blocks in the data sequence may be contiguous or non-contiguous; and if a specific observation bit satisfies the synchronization condition, determining a position of the observation bit as the synchronization location. In this way, it is possible to end observation bit verification in advance, thereby saving resources for determining the synchronization location.

Herein, the fifth threshold is a value obtained when M is equal to 1 below, and the sixth threshold is a value obtained when Q is equal to 1 below. The fifth threshold and the sixth threshold may be set based on an empirical value, or may be set based on a simulation analysis result.

Figure 12:
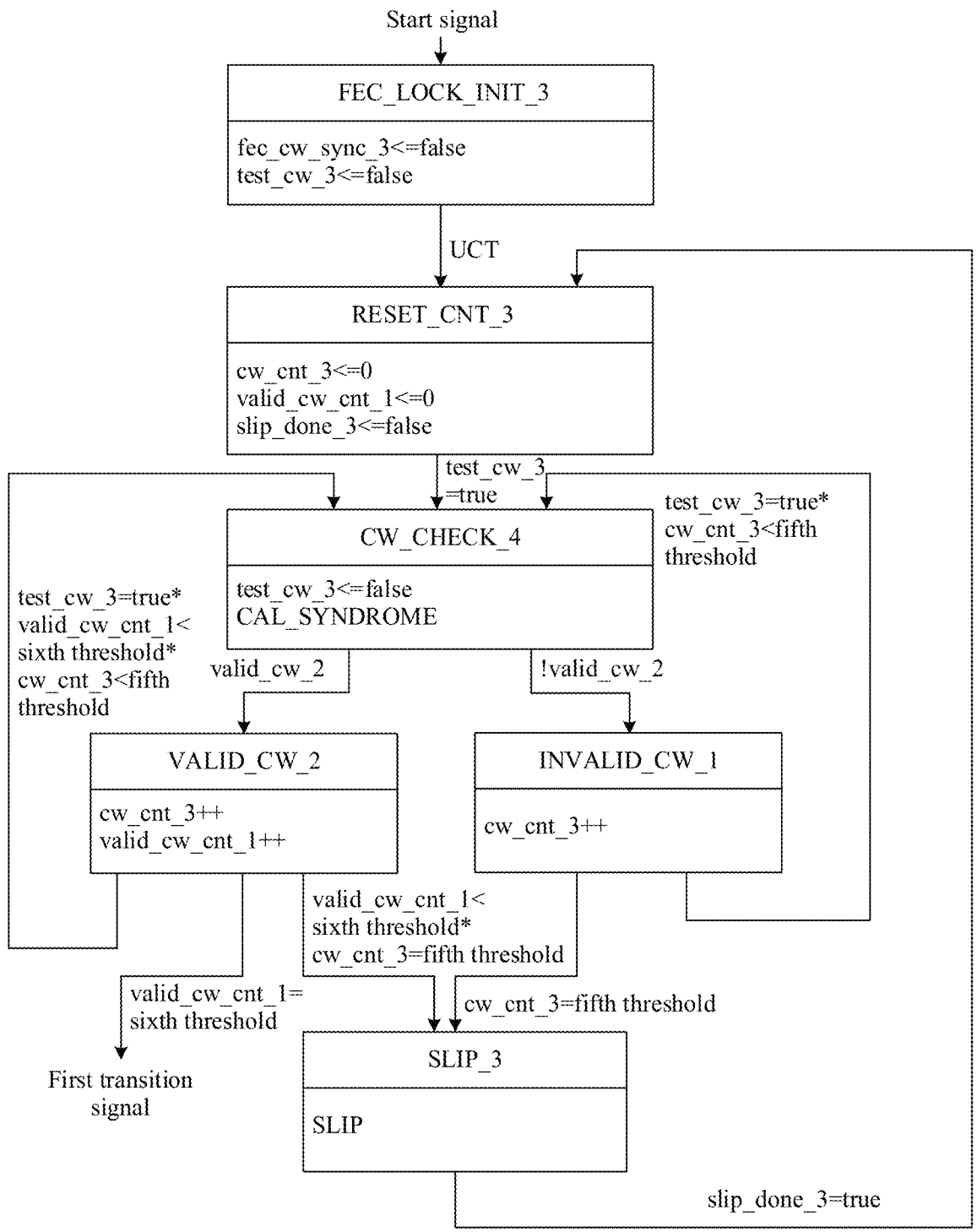
FIG. 12 is a state diagram of determining a candidate position according to an example embodiment of the present disclosure.

Specifically, for the state diagram of determining the synchronization position, refer to the descriptions in FIG. 12 below. This is equivalent to that a signal that is output in FIG. 12 is a second transition signal. The second transition signal is used to trigger to enter {loss-of-lock detection state}.

Figure 10:
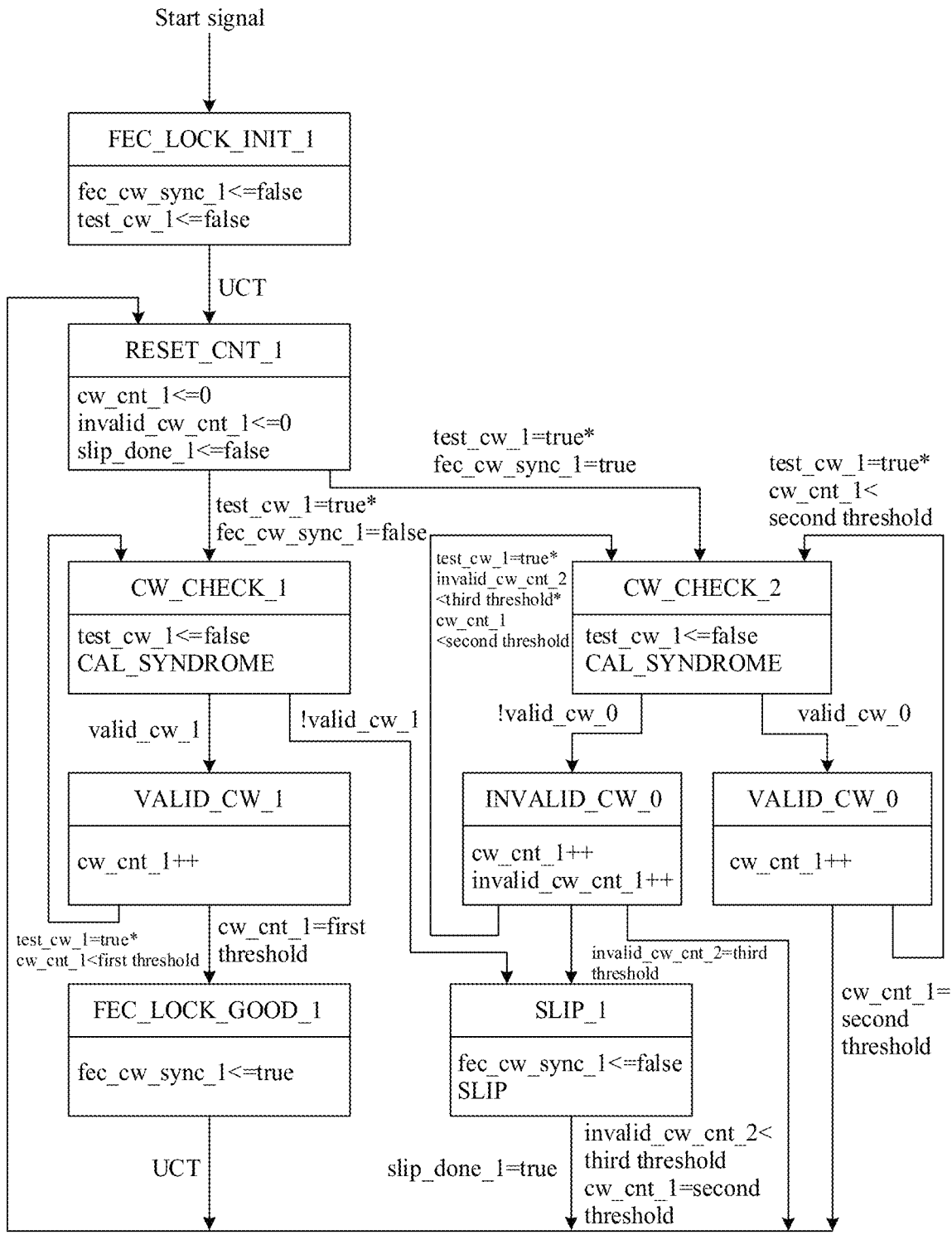
FIG. 10 is a state diagram of synchronization position determining and loss-of-lock detection according to an example embodiment of the present disclosure.

For example, after the synchronization position is determined, {loss-of-lock detection state} is entered. FIG. 10 is a state diagram in which a state machine implements a codeword synchronization process. In the state diagram shown in FIG. 10, a synchronization position determining process and a loss-of-lock detection process share {first counter reset substate} and {first slip substate}.

Specifically, referring to FIG. 10, {loss-of-lock detection state} includes {second codeword verification substate}, and {second codeword verification substate} is a state in which a codeword is verified. {first counter reset substate} is entered in response to determining the synchronization position, or {first counter reset substate} is entered through unconditional transition when a value of [first synchronization lock variable] is a second value. An initial value of [first codeword counter] and an initial value of [first invalid codeword counter] are set in {first counter reset substate}. Both the initial values may be 0. One codeword is selected from the data sequence based on the synchronization position. Herein, for ease of description, the codeword selected based on the synchronization position is referred to as a first codeword.

{second codeword verification substate} is entered in response to selecting one first codeword; and the first codeword is verified in {second codeword verification substate}.

The count value of [first codeword counter] is increased by Y and a count value of [first invalid codeword counter] is increased by Z in response to the first codeword not satisfying the verification condition, where both Y and Z are integers greater than or equal to 1. In response to the count value of [first invalid codeword counter] being equal to a third threshold in a case in which the count value of [first codeword counter] is less than or equal to a second threshold, it indicates that a quantity of invalid codewords has reached a quantity of updated synchronization positions, and {synchronization position determining state} is re-entered, to perform a synchronization position updating operation. When Y is equal to 1, the second threshold is a quantity of first codewords selected based on the synchronization position. When Y is greater than 1, the second threshold is Y times the quantity of first codewords selected based on the synchronization position. When Z is equal to 1, the third threshold is a quantity of first codewords that do not satisfy the verification condition. When Z is greater than 1, the third threshold is Z times the quantity of first codewords that do not satisfy the verification condition. The second threshold and the third threshold may be set based on an empirical value, or may be set based on a simulation analysis result.

Optionally, whether the first codeword satisfies the verification condition may be determined based on an characteristic value of the first codeword. For principles, refer to Formula (1) and Formula (2).

Optionally, {loss-of-lock detection state} further includes {codeword invalid substate}, and {codeword invalid substate} is a state that is entered when the first codeword does not satisfy the verification condition. {codeword invalid substate} is entered in response to the first codeword not satisfying the verification condition. The count value of [first codeword counter] is increased by Y and the count value of [first invalid codeword counter] is increased by Z in {codeword invalid substate}.

Optionally, {second codeword verification substate} is re-entered in response to the count value of [first codeword counter] being less than the second threshold and the count value of [first invalid codeword counter] being less than the third threshold; and a next first codeword is selected based on the synchronization position, and the next first codeword is verified. Herein, that the count value of [first invalid codeword counter] is less than the third threshold indicates that a quantity of invalid codewords is relatively small, and verification may be performed on a next first codeword.

Optionally, in response to the count value of [first codeword counter] being equal to the second threshold and the count value of [first invalid codeword counter] being less than the third threshold, {first counter reset substate} is re-entered, and next verification continues to be performed on the synchronization position. Herein, a quantity of invalid codewords in second-threshold first codewords is relatively small, which indicates that the synchronization position is currently accurate, and verification may continue to be performed.

Optionally, a value of [codeword valid variable] is set to a first value in response to the first codeword not satisfying the verification condition; and {codeword invalid substate} is entered in response to the value of [codeword valid variable] being the first value.

Optionally, the count value of [first codeword counter] is increased by Y in response to the first codeword satisfying the verification condition; and in response to the count value of [first codeword counter] being equal to the second threshold, {first counter reset substate} is re-entered, which indicates that the synchronization position is accurate, and next verification continues to be performed on the synchronization position.

{second codeword verification substate} is re-entered in response to the count value of [first codeword counter] being less than the second threshold; and a next first codeword is selected based on the synchronization position, and the next first codeword is verified.

Optionally, {loss-of-lock detection state} further includes {codeword valid substate}, and {codeword valid substate} is a state that is entered when the first codeword satisfies the verification condition. {codeword valid substate} is entered in response to the first codeword satisfying the verification condition.

Optionally, a value of [codeword valid variable] is set to a second value in response to the first codeword satisfying the verification condition; and {codeword valid substate} is entered in response to the value of [codeword valid variable] being the second value.

Optionally, in a case in which {synchronization position determining state} further includes {first slip substate}, a process of re-entering {synchronization position determining state} is: entering {first slip substate} in response to the count value of [first invalid codeword counter] being equal to the third threshold; slipping to a next observation bit in the data sequence in {first slip substate}; and in response to slipping to the next observation bit, entering {first counter reset substate}, and verifying the next observation bit.

Optionally, a value of [first slip completion variable] is set to the second value after the next observation bit is slipped to; {first counter reset substate} is re-entered in response to the value of [first slip completion variable] being the second value; and in {first counter reset substate}, the value of [first slip completion variable] is set to the first value, and the next observation bit is verified.

Optionally, a value of [first codeword to-be-verified variable] is set to a fourth value after one first codeword is selected; {second codeword verification substate} is entered in response to the value of [first codeword to-be-verified variable] being the fourth value and the value of [first synchronization lock variable] being the second value; and the value of [first codeword to-be-verified variable] is set to a third value after {second codeword verification substate} is entered.

In the state diagram shown in FIG. 10, {first synchronization lock initialization substate} is represented as FEC_LOCK_INIT_1, {first counter reset substate} is represented as RESET_CNT_1, {second codeword verification substate} is represented as CW_CHECK_2, {codeword valid substate} is represented as VALID_CW_0, {first slip substate} is represented as SLIP_1, {first synchronization lock success substate} is represented as FEC_LOCK_GOOD_1, and {codeword invalid substate} is represented as INVALID_CW_0. [first synchronization lock variable] is represented as fec_cw_sync_1, [first codeword to-be-verified variable] is represented as test_cw_1, the count value of [first codeword counter] is represented as cw_cnt_1, the value of [codeword valid variable] is represented as valid_cw_0 when being set to the second value, the value of [codeword valid variable] is represented as !valid_cw_0 when being set to the first value, the count value of [first invalid codeword counter] is represented as invalid_cw_cnt_1, and [first slip completion variable] is represented as slip_done_1.

In the state diagram shown in FIG. 10, the first test block selected based on the observation bit belongs to a first subsequence, the first codeword selected based on the synchronization position belongs to a second subsequence, both the first subsequence and the second subsequence belong to the data sequence, and the second subsequence is located after the first subsequence.

In another implementation, the N observation bits are selected from the data sequence in {synchronization position determining state}, where N is greater than or equal to 1; a candidate position is selected from the positions of the N observation bits; and the synchronization position is determined based on the candidate position.

The candidate position is a location that is most likely to be the synchronization position. The candidate position may be determined as the synchronization position. Alternatively, a plurality of test blocks selected based on the candidate position are verified, and the candidate position is determined as the synchronization position after the verification succeeds.

For example, there are a plurality of manners of determining the candidate position. The following provides three possible implementations. Refer to Manner 1 to Manner 3.

Manner 1: Traverse the N observation bits, and determine the candidate position in the positions of the N observation bits. For example, the N observation bits are traversed, fourth-threshold test blocks are continuously selected based on each observation bit, and a quantity of test blocks that satisfy the verification condition in the fourth-threshold test blocks is determined, where positions of the fourth-threshold test blocks in the data sequence may be contiguous or non-contiguous. A position of an observation bit corresponding to a largest quantity of test blocks that satisfy the verification condition is determined as the candidate position, or a position of an observation bit corresponding to a smallest quantity of test blocks that do not satisfy the verification condition is determined as the candidate position. In this way, because the N observation bits are traversed, the determined candidate position is most likely to be the synchronization position. In this implementation, a value of N may be a quantity of bits included in a single codeword.

Specifically, referring to a state diagram shown in FIG. 11, {synchronization position determining state} includes {second counter reset substate}, {third codeword verification substate}, and {candidate position selection substate}, where {second counter reset substate} is a state in which a counter is reset, {third codeword verification substate} is a state in which a test block is verified, and {candidate position selection substate} is a state in which a candidate position is selected.

An initial value of [second codeword counter] and an initial value of [first currently-valid codeword counter] are set in {second counter reset substate}, one observation bit is selected from the received data sequence, and one test block is selected from the data sequence based on the current observation bit. For ease of description, the selected test block is referred to as a second test block, a length of the second test block is equal to a codeword length, and one second test block simulates one codeword.

{third codeword verification substate} is entered in response to selecting the second test block.

The second test block is verified in {third codeword verification substate}. For a verification manner, refer to the foregoing verification manner of the first test block. A count value of [second codeword counter] is increased by W in {third codeword verification substate}. A count value of [first currently-valid codeword counter] is increased by P in response to the second test block satisfying the verification condition, where both W and P are integers greater than or equal to 1.

{candidate position selection substate} is entered in response to the count value of [second codeword counter] being equal to the fourth threshold. Herein, the count value of [second codeword counter] is equal to the fourth threshold. In a case in which W is equal to 1, it indicates that verification has been performed on fourth-threshold second test blocks corresponding to the current observation bit, and it may be determined whether the position of the current observation bit is the candidate position. In a case in which W is greater than 1, it indicates that verification has been performed on a plurality of second test blocks corresponding to the current observation bit, and it may be determined whether the position of the current observation bit is the candidate position.

A value of [observation bit quantity variable] is increased by 1 in {candidate position selection substate}.

In {candidate position selection substate}, in response to the count value of [first currently-valid codeword counter] being greater than a current value of [maximum valid codeword quantity variable], the value of [candidate synchronization position variable] is updated to the position of the current observation bit, and the value of [maximum valid codeword quantity variable] is updated to the count value of [first currently-valid codeword counter]. When the count value of [first currently-valid codeword counter] is less than the current value of [maximum valid codeword quantity variable], [candidate synchronization position variable] is not updated. When the count value of [first currently-valid codeword counter] is equal to the current value of [maximum valid codeword quantity variable], [candidate synchronization position variable] may be updated, or [candidate synchronization position variable] may not be updated.

A next observation bit that is after the current observation bit in the data sequence is verified in response to the value of [observation bit quantity variable] being less than N. Herein, that the value of [observation bit quantity variable] is less than N indicates that the N observation bits are not completely verified, a next observation bit should be selected, and the next observation bit is verified.

The value of [candidate synchronization position variable] is determined as the candidate position in response to the value of [observation bit quantity variable] being equal to N. Optionally, after the candidate position is determined, a first transition signal may be output. The first transition signal may be the candidate position, or may be a signal that triggers to enter a next state.

A value relationship between the count value of [second codeword counter] and the fourth threshold is determined in response to the second test block not satisfying the verification condition. In response to the count value of [second codeword counter] being less than the fourth threshold, a next second test block is selected based on the current observation bit, and the next second test block is verified. {candidate position selection substate} is entered in response to the count value of [second codeword counter] being equal to the fourth threshold.

Optionally, {synchronization position determining state} further includes {second synchronization lock initialization substate}.

Before {second counter reset substate} is entered, {second synchronization lock initialization substate} is entered in response to detecting [start signal]. In {second synchronization lock initialization substate}, the value of [observation bit quantity variable] is set to a fifth value, where the fifth value may be 0, the value of [candidate synchronization position variable] is set to a sixth value, where the sixth value may be 0, and a value of [maximum valid codeword quantity variable] is set to a seventh value, where the seventh value may be 0.

Optionally, after these variables are set, {second counter reset substate} is entered through unconditional transition.

Optionally, a value of [second synchronization lock variable] is set to a first value in {second synchronization lock initialization substate}.

Optionally, a value of [current position quantity variable] is set to 0 or the like in {second synchronization lock initialization substate}; and the value of [current position quantity variable] is increased by 1 in {candidate position selection substate}. In this way, a current position variable is recorded, so that the position of the traversed current observation bit can be obtained.

Optionally, a value of [second codeword to-be-verified variable] is set to a third value in {second synchronization lock initialization substate}.

Optionally, a value of [second codeword to-be-verified variable] is set to a fourth value in response to selecting one second test block from the data sequence based on the current observation bit, where the fourth value may be true or another value; {third codeword verification substate} is entered in response to the value of [second codeword to-be-verified variable] being the fourth value; and in {third codeword verification substate}, the value of [second codeword to-be-verified variable] is set to a third value, to verify the second test block.

Optionally, in response to the count value of [second codeword counter] being less than the fourth threshold and the value of [second codeword to-be-verified variable] being the fourth value, {third codeword verification substate} is re-entered, a next second test block is selected based on the current observation bit, and the next second test block is verified.

Optionally, {synchronization position determining state} further includes {second slip substate}, and {second slip substate} is a state in which an observation bit is slipped to. In response to the value of [observation bit quantity variable] being less than N, it indicates that the N observation bits have not been traversed completely, and {second slip substate} is entered. A position of a next observation bit in the data sequence is slipped to in {second slip substate}. In response to slipping to the next observation bit, {second counter reset substate} is entered, and the next observation bit is verified. Therefore, in this manner, all observation bits can be traversed, and a most possible candidate position can be selected, so that the selected candidate position can be more accurate.

After slipping to the next observation bit, a value of [second slip completion variable] is set to a second value, where the second value is true or another value. In response to the value of [second slip completion variable] being the second value, {second counter reset substate} is entered, and the next observation bit is verified. The value of [second slip completion variable] is set to a first value in {second counter reset substate}, where the first value is false or another value.

Herein, all observation bits are verified through same processing. For an observation bit selection manner, refer to the foregoing descriptions.

In the state diagram shown in FIG. 11, {second synchronization lock initialization substate} is represented as FEC_LOCK_INIT_2, {second counter reset substate} is represented as RESET_CNT_2, {third codeword verification substate} is represented as CW_CHECK_3, {candidate position selection substate} is represented as SELECT_SYNC_LOCK, and {second slip substate} is represented as SLIP_2. [second synchronization lock variable] is represented as fec_cw_sync_2, [second codeword to-be-verified variable] is represented as test_cw_2, the count value of [second codeword counter] is represented as cw_cnt_2, [second slip completion variable] is represented as slip_done_2, [observation bit quantity variable] is represented as location_num, [candidate synchronization position variable] is represented as sync_location, [maximum valid codeword quantity variable] is represented as max_valid_cw_cnt, [current position quantity variable] is represented as current_location, the count value of [first currently-valid codeword counter] is represented as current_valid_cw_cnt, "codeword valid" is represented as valid_cw, and "if" indicates if.

Manner 2: Start from a $1^{st}$ observation bit, sequentially verify whether all observation bits satisfy a synchronization condition, where the synchronization condition may be that at least a specific quantity of test blocks satisfy the verification condition in a plurality of test blocks continuously selected based on the observation bit, positions of the plurality of test blocks in the data sequence may be contiguous or non-contiguous, and positions of the specific quantity of test blocks in the data sequence may be contiguous or non-contiguous; and if a specific observation bit satisfies the synchronization condition, determine a position of the observation bit as the candidate location. In this way, it is possible to end observation bit verification in advance, thereby saving resources for determining the candidate location.

Specifically, referring to a state diagram shown in FIG. 12, {synchronization position determining state} includes {third counter reset substate}, {fourth codeword verification substate}, and {second codeword valid substate}, where {third counter reset substate} is a state in which a counter is reset, {fourth codeword verification substate} is a state in which a test block is verified, and {second codeword valid substate} is a state that is entered when a test block satisfies the verification condition.

An initial value of [third codeword counter] and an initial value of [first valid codeword counter] are set in {third counter reset substate}. One observation bit is selected from the data sequence, and one test block is selected from the data sequence based on the current observation bit. For ease of description, the selected test block is referred to as a third test block. A length of the third test block is equal to a codeword length, and a start position of the third test block and a position of the observation bit are separated by an integer quantity of codeword lengths.

{fourth codeword verification substate} is entered in response to selecting the one third test block. The third test block is verified in {fourth codeword verification substate}. For a verification manner, refer to the verification manner of the first test block.

{second codeword valid substate} is entered in response to the third test block satisfying the verification condition. The count value of [third codeword counter] is increased by M and the count value of [first valid codeword counter] is increased by Q in {second codeword valid substate}, where both M and Q are integers greater than or equal to 1.

The position of the current observation bit is determined as the candidate position in response to the count value of [first valid codeword counter] being equal to a sixth threshold in a case in which the count value of [third codeword counter] is less than or equal to a fifth threshold. Optionally, after the candidate position is determined, a first transition signal may be output. The first transition signal may be the candidate position, or may be a signal that triggers to enter a next state. When M is equal to 1, the fifth threshold is a quantity of third test blocks selected based on the observation bit. When M is greater than 1, the fifth threshold is M times the quantity of third test blocks selected based on the observation bit. When Q is equal to 1, the sixth threshold is a quantity of third test blocks that satisfy the verification condition. When Q is greater than 1, the sixth threshold is Q times the quantity of third test blocks that satisfy the verification condition. The fifth threshold and the sixth threshold may be set based on an empirical value, or may be set based on a simulation analysis result.

Optionally, in {second codeword valid substate}, in response to the count value of [third codeword counter] being equal to the fifth threshold and the count value of [first valid codeword counter] being less than the sixth threshold, it indicates that fifth-threshold third test blocks do not include sixth-threshold third test blocks that satisfy the verification condition, and a next observation bit selected from the data sequence is verified.

In {second codeword valid substate}, in response to the count value of [third codeword counter] being less than the fifth threshold and the count value of [first valid codeword counter] being less than the sixth threshold, it indicates that the fifth-threshold third test blocks are not completely verified. {fourth codeword verification substate} is re-entered, and a next third test block selected based on the current observation bit is verified.

Optionally, a value of [second codeword valid variable] is set to a second value in response to the third test block satisfying the verification condition; and {second codeword valid substate} is entered in response to the value of [second codeword valid variable] being the second value.

Optionally, {synchronization position determining state} further includes {first codeword invalid substate}, and {first codeword invalid substate} is a state that is entered when a test block does not satisfy the verification condition. {first codeword invalid substate} is entered in response to the third test block not satisfying the verification condition; and the count value of [third codeword counter] is increased by M in {first codeword invalid substate}.

The next observation bit selected from the data sequence is verified in response to the count value of [third codeword counter] being equal to the fifth threshold. In response to the count value of [third codeword counter] being less than the fifth threshold, it indicates that the fifth-threshold third test blocks are not completely verified. {fourth codeword verification substate} is re-entered, and a next third test block selected based on the current observation bit is verified.

Optionally, a value of [second codeword valid variable] is set to a first value in response to the third test block not satisfying the verification condition; and {first codeword invalid substate} is entered in response to the value of [second codeword valid variable] being the first value.

Optionally, {synchronization position determining state} further includes {third slip substate}, and {third slip substate} is a state in which a next observation bit is slipped to. {third slip substate} is entered in {first codeword invalid substate} in response to the count value of [third codeword counter] being equal to the fifth threshold. Alternatively, {third slip substate} is entered in {second codeword valid substate} in response to the count value of [third codeword counter] being equal to the fifth threshold and the count value of [first valid codeword counter] being less than the sixth threshold. A next observation bit is slipped to in {third slip substate}. In response to slipping to the next observation bit, {third counter reset substate} is re-entered, and the next observation bit is verified.

After slipping to the next observation bit, a value of [third slip completion variable] is set to a second value, where the second value is true or another value. In response to the value of [third slip completion variable] being the second value, {third counter reset substate} is entered, and the next observation bit is verified. The value of [third slip completion variable] is set to a first value in {third counter reset substate}, where the first value is false or another value.

Optionally, {synchronization position determining state} further includes {third synchronization lock initialization substate}, and {third synchronization lock initialization substate} is an initialization state. Before {third counter reset substate} is entered, {third synchronization lock initialization substate} is entered in response to detecting the start signal.

In {third synchronization lock initialization substate}, a value of [third synchronization lock variable] is set to a first value, and a value of [third codeword to-be-verified variable] is set to a third value, where the third value is false or another value. After the processing is completed, {third counter reset substate} is entered through unconditional transition. The value of [third codeword to-be-verified variable] is set to a fourth value after the one third test block is selected based on the current observation bit, where the fourth value is true or another value.

In {third counter reset substate}, {fourth codeword verification substate} is entered in response to the value of [third codeword to-be-verified variable] being the fourth value.

In {second codeword valid substate}, in response to the value of [third codeword to-be-verified variable] being the fourth value and in response to the count value of [third codeword counter] being less than the fifth threshold and the count value of [first valid codeword counter] being less than the sixth threshold, {fourth codeword verification substate} is re-entered, and a next third test block selected based on the current observation bit is verified.

In {first codeword invalid substate}, in response to the value of [third codeword to-be-verified variable] being the fourth value and in response to the count value of [third codeword counter] being less than the fifth threshold, {fourth codeword verification substate} is re-entered, and a next third test block selected based on the current observation bit is verified.

In the procedure shown in FIG. 12, all observation bits are verified through same processing. For an observation bit selection manner, refer to the foregoing descriptions.

Manner 3: Start from a $1^{st}$ observation bit, sequentially verify whether all observation bits satisfy a synchronization condition, where the synchronization condition may be that a plurality of test blocks continuously selected based on the observation bit satisfy the verification condition, and positions of the plurality of test blocks in the data sequence may be contiguous or non-contiguous; and if a specific observation bit satisfies the synchronization condition, determine a position of the observation bit as the candidate location. In this way, it is possible to end observation bit verification in advance, thereby saving resources for determining the candidate location. This implementation is a special example of Manner 2.

Figure 13:
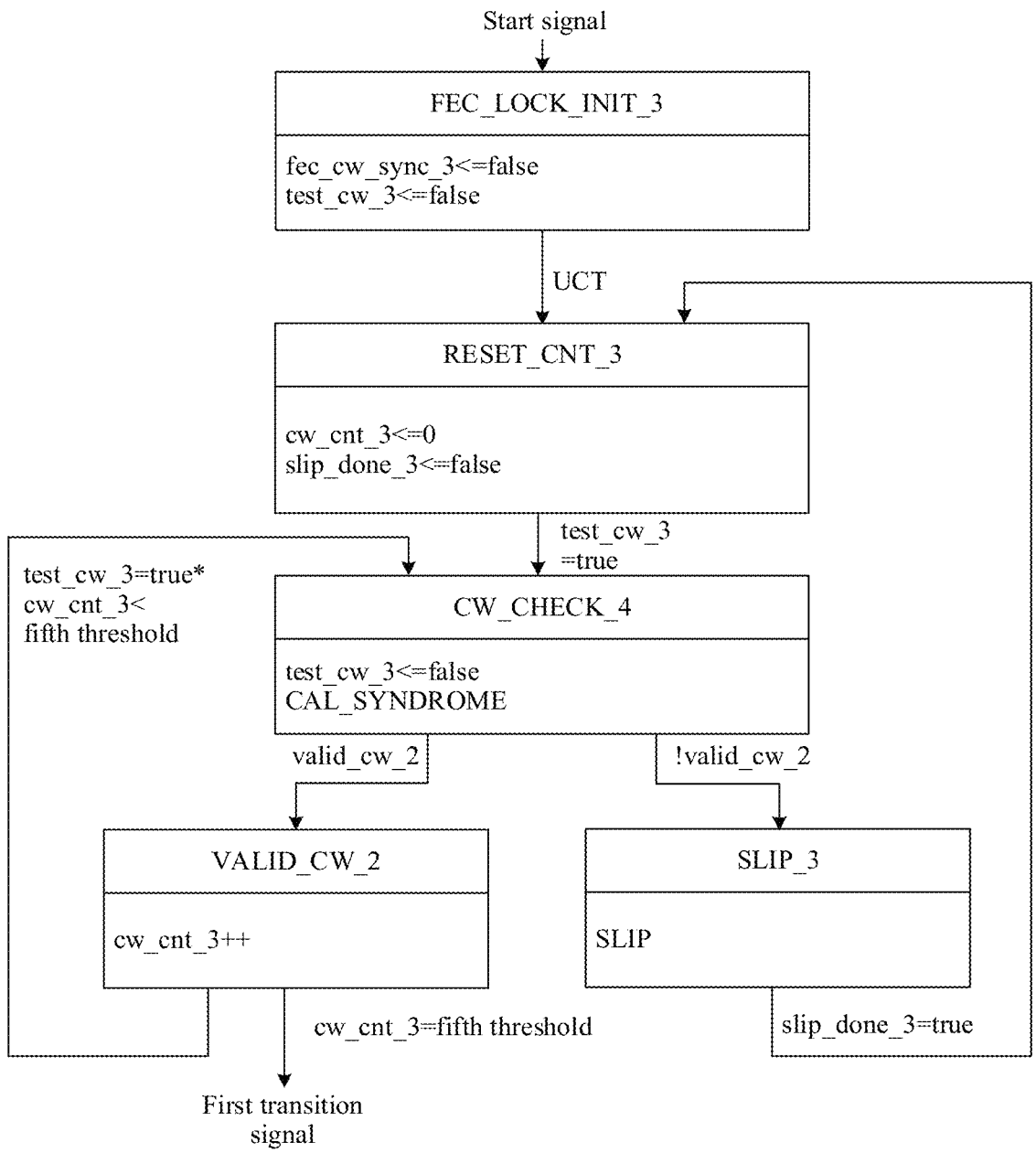
FIG. 13 is a state diagram of determining a candidate position according to an example embodiment of the present disclosure.

Specifically, referring to a state diagram shown in FIG. 13, {synchronization position determining state} includes {third counter reset substate}, {fourth codeword verification substate}, and {second codeword valid substate}.

An initial value of the third codeword counter is set in {third counter reset substate}. One observation bit is selected from the data sequence, and one test block is selected from the data sequence based on the current observation bit. For ease of description, the selected test block is referred to as a third test block.

{fourth codeword verification substate} is entered in response to selecting the one third test block. The third test block is verified in {fourth codeword verification substate}. For example, the third test block is verified based on an characteristic value of the third test block.

{second codeword valid substate} is entered in response to the third test block satisfying the verification condition. The count value of [third codeword counter] is increased by M in {second codeword valid substate}.

The position of the current observation bit is determined as the candidate position in response to the count value of [third codeword counter] being equal to a fifth threshold. Optionally, after the candidate position is determined, a first transition signal may be output. The first transition signal may be the candidate position, or may be a signal that triggers to enter a next state.

A next third test block selected based on the current observation bit is verified in response to the count value of [third codeword counter] being less than the fifth threshold.

{third slip substate} is entered in response to the third test block not satisfying the verification condition. A next observation bit is slipped to in {third slip substate}. In response to slipping to the next observation bit, {third counter reset substate} is entered, and the next observation bit is verified.

Optionally, a value of [second codeword valid variable] is set to a second value in response to the third test block satisfying the verification condition; and {second codeword valid substate} is entered in response to the value of [second codeword valid variable] being the second value. For specific slip descriptions, refer to the descriptions of FIG. 12.

Optionally, {synchronization position determining state} further includes {third synchronization lock initialization substate}. For descriptions, refer to the foregoing descriptions.

In the state diagrams shown in FIG. 12 and FIG. 13, {third counter reset substate} is represented as RESET_CNT_3, {fourth codeword verification substate} is represented as CW_CHECK_4, {third slip substate} is represented as SLIP_3, {third synchronization lock initialization substate} is represented as FEC_LOCK_INIT_3, {first codeword invalid substate} is represented as INVALID_CW_1, and {second codeword valid substate} is represented as VALID_CW_2. [third synchronization lock variable] is represented as fec_cw_sync_3, [third codeword to-be-verified variable] is represented as test_cw_3, the count value of [third codeword counter] is represented as cw_cnt_3, [third slip completion variable] is represented as slip_done_3, the count value of [first valid codeword counter] is represented as valid_cw_cnt_1, the value of [second codeword valid variable] is represented as valid_cw_2 when being setting to the second value, and the value of [second codeword valid variable] is represented as !valid_cw_2 when being setting to the first value.

For example, after the candidate position is selected, the synchronization position is determined based on the candidate position.

In a first implementation of determining the synchronization position based on the candidate position, the candidate position is determined as the synchronization position. Specifically, {synchronization position determining state} further includes {third synchronization lock success substate}. When the candidate position is determined in Manner 1, {third synchronization lock success substate} is entered in response to the value of [observation bit quantity variable] being equal to N. When the candidate position is determined in Manner 2, {third synchronization lock success substate} is entered in response to the count value of [second valid codeword counter] being equal to the sixth threshold. When the candidate position is determined in Manner 3, {third synchronization lock success substate} is entered in response to the count value of [third codeword counter] being equal to the fifth threshold. A value of [synchronization lock variable] is set to a second value in {third synchronization lock success substate}. In the first implementation of determining the synchronization position based on the candidate position, the candidate position is directly determined as the synchronization position, so that resources for determining the synchronization position can be saved.

In the second implementation of determining the synchronization position based on the candidate position, the candidate position is verified, and the candidate position is determined as the synchronization position after the verification succeeds.

Figure 14:
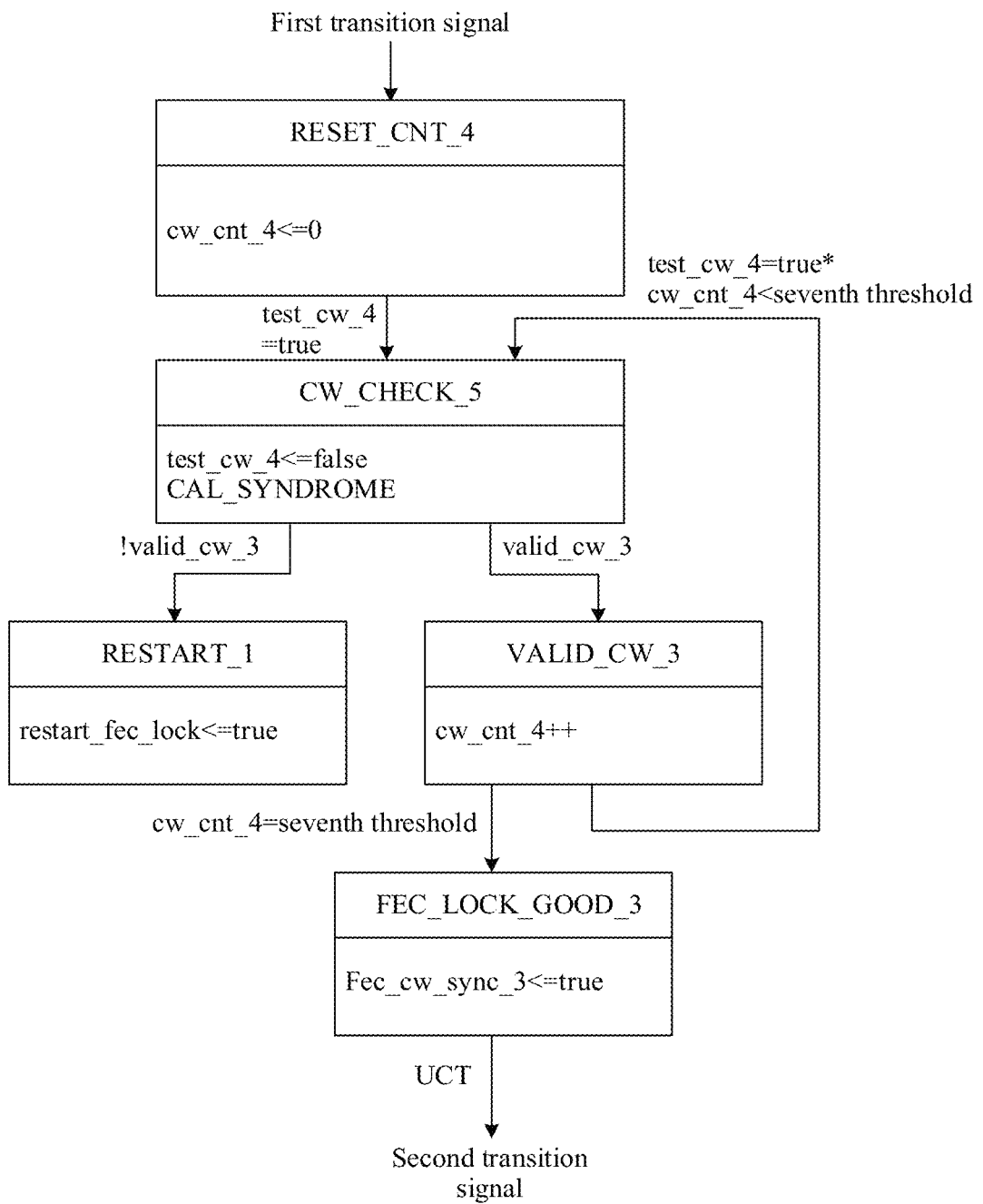
FIG. 14 is a state diagram of determining to verify a candidate position according to an example embodiment of the present disclosure.

Specifically, in an implementation, referring to a state diagram shown in FIG. 14, a plurality of test blocks are continuously selected based on the candidate position. For ease of description, the test block selected in this implementation is referred to as a fourth test block. If the plurality of test blocks all satisfy the verification condition, the candidate position is determined as the synchronization position, where positions of the plurality of test blocks in the data sequence may be contiguous or non-contiguous.

{synchronization position determining state} further includes {fourth counter reset substate} and {fifth codeword verification substate}, where {fourth counter reset substate} is a state in which a counter is reset, and {fifth codeword verification substate} is a state in which a test block is verified.

An initial value of [fourth codeword counter] is set in {fourth counter reset substate}. For the candidate position, [fourth codeword counter] is used to record a quantity of test blocks selected based on the candidate position. The fourth test block is selected from the data sequence based on the candidate position. {fifth codeword verification substate} is entered in response to selecting the one fourth test block.

The fourth test block is verified in {fifth codeword verification substate}. For a verification manner, refer to the foregoing verification manner of the first test block.

A count value of [fourth codeword counter] is increased by R in response to the fourth test block satisfying the verification condition, where R is an integer greater than or equal to 1. The candidate position is determined as the synchronization position in response to the count value of [fourth codeword counter] being equal to a seventh threshold.

When R is equal to 1, the seventh threshold is a quantity of fourth test blocks selected based on the candidate position. When R is greater than 1, the seventh threshold is R times the quantity of fourth test blocks selected based on the candidate position. The seventh threshold may be set based on an empirical value, or may be set based on a simulation analysis result.

Optionally, the synchronization position determining state further includes {third codeword valid substate}, and {third codeword valid substate} is a state that is entered when a test block satisfies the verification condition. {third codeword valid substate} is entered in response to the fourth test block satisfying the verification condition. The count value of [fourth codeword counter] is increased by R in {third codeword valid substate}. The candidate position is determined as the synchronization position in response to the count value of [fourth codeword counter] being equal to a seventh threshold. In response to the count value of [fourth codeword counter] being less than the seventh threshold, {fifth codeword verification substate} is re-entered, and a next fourth test block selected based on the candidate position is verified.

Optionally, a candidate position is reselected in response to the fourth test block not satisfying the verification condition.

Optionally, a value of [third codeword valid variable] is set to a second value in response to the fourth test block satisfying the verification condition, where the second value is true or another value. {third codeword valid substate} is entered in response to the value of [third codeword valid variable] being the second value.

A value of [third codeword valid variable] is set to a first value in response to the fourth test block not satisfying the verification condition, where the first value is false or another value. A candidate position is reselected in response to the value of [third codeword valid variable] being the first value.

Optionally, {synchronization position determining state} further includes {first restart substate}. {first restart substate} is entered in response to the value of [third codeword valid variable] being the first value. A value of [re-synchronization lock variable] is set to a second value in {first restart substate}. In response to the value of [re-synchronization lock variable] being the second value, it is determined that the start signal is detected, and a candidate position is reselected.

Optionally, {synchronization position determining state} further includes {third synchronization lock success substate}, and {third synchronization lock success substate} is a state in which a synchronization position is determined. {third synchronization lock success substate} is entered in response to the count value of [fourth codeword counter] being equal to the seventh threshold. A value of [third synchronization lock variable] is set to a second value in {third synchronization lock success substate}. In response to the value of [third synchronization lock variable] being the second value, that the value of [third synchronization lock variable] is the second value indicates that the candidate position is the synchronization position, and a second transition signal may be output through unconditional transition. The second transition signal is used to trigger to enter {loss-of-lock detection state}, and the second transition signal may be the synchronization position or another trigger signal.

Optionally, a value of [fourth codeword to-be-verified variable] is set to a second value in response to selecting one fourth test block based on the synchronization position, and {fifth codeword verification substate} is entered in response to the value of [fourth codeword to-be-verified variable] being the second value. Alternatively, {fifth codeword verification substate} is entered in response to the value of [fourth codeword to-be-verified variable] being the second value and the count value of [fourth codeword counter] being less than the seventh threshold. A value of [fourth codeword to-be-verified variable] is set to a first value in {fifth codeword verification substate}.

In this way, after the candidate position is determined, whether the candidate position is the synchronization position continues to be further determined, thereby further improving accuracy of the synchronization position.

In the state diagram shown in FIG. 14, {third synchronization lock success substate} is represented as FEC_LOCK_GOOD_3, {fourth counter reset substate} is represented as RESET_CNT_4, {fifth codeword verification substate} is represented as CW_CHECK_5, {third codeword valid substate} is represented as VALID_CW_3, and {first restart substate} is represented as RESTART_1. [third synchronization lock variable] is represented as fec_cw_sync_3, [fourth codeword to-be-verified variable] is represented as test_cw_4, the count value of [fourth codeword counter] is represented as cw_cnt_4, [re-synchronization lock variable] is represented as restart_fec_lock, the value of [third codeword valid variable] is represented as !valid_cw_3 when being the first value, and the value of [third codeword valid variable] is represented as valid_cw_3 when being the second value.

In another implementation, a plurality of test blocks are continuously selected based on the candidate position. For ease of description, the test block selected in this implementation is referred to as a fifth test block. If a specific quantity of test blocks in the plurality of test blocks satisfy the verification condition, the candidate position is determined as the synchronization position, where positions of the plurality of test blocks in the data sequence may be contiguous or non-contiguous, and positions of the specific quantity of test blocks in the data sequence may be contiguous or non-contiguous.

Figure 15:
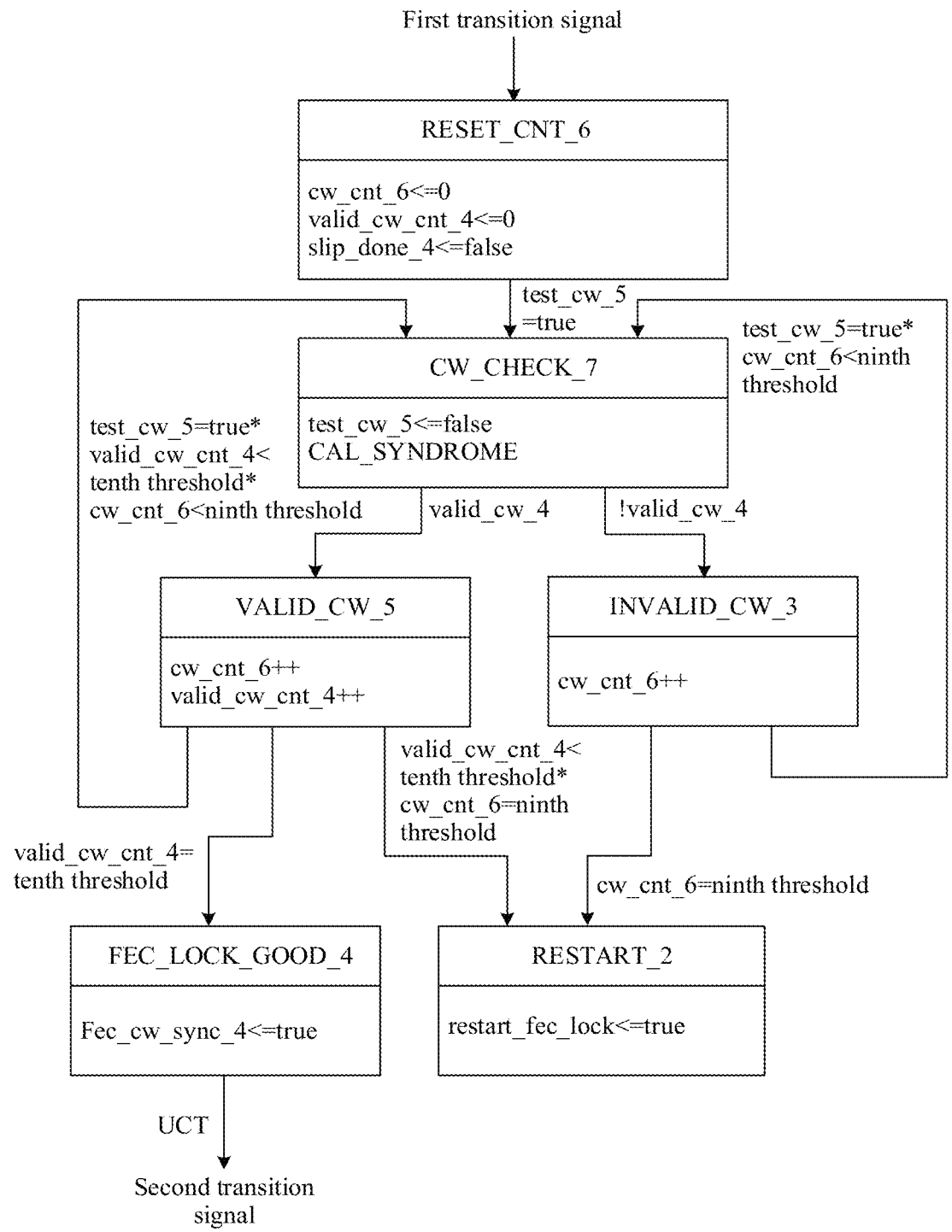
FIG. 15 is a state diagram of determining to verify a candidate position according to an example embodiment of the present disclosure.

Specifically, referring to a state diagram shown in FIG. 15, {synchronization position determining state} further includes {sixth counter reset substate}, {seventh codeword verification substate}, and {fifth codeword valid substate}, where {sixth counter reset substate} is a state in which a counter is reset, {seventh codeword verification substate} is a state in which a test block is verified, and {fifth codeword valid substate} is a state that is entered when a test block satisfies the verification condition.

An initial value of [sixth codeword counter] and an initial value of [fourth valid codeword counter] are set in {sixth counter reset substate}. For the candidate position, [sixth codeword counter] is used to record a quantity of test blocks selected based on the candidate position, and [fourth valid codeword counter] is used to record a quantity of test blocks that satisfy the verification condition. One fifth test block is selected from the data sequence based on the candidate position. {seventh codeword verification substate} is entered in response to selecting the one fifth test block.

Optionally, in {sixth counter reset substate}, the value of [fourth slip completion variable] may be further set to the first value, to indicate that slip does not need to be performed currently.

The fifth test block is verified in {seventh codeword verification substate}. For a verification manner, refer to the foregoing verification manner of the first test block.

{fifth codeword valid substate} is entered in response to the fifth test block satisfying the verification condition. In {fifth codeword valid substate}, the count value of [sixth codeword counter] is increased by E, where E is an integer greater than or equal to 1, and the count value of [fourth valid codeword counter] is increased by F, where F is an integer greater than or equal to 1. The candidate position is determined as the synchronization position in response to the count value of [fourth valid codeword counter] being equal to a tenth threshold in a case in which the count value of [sixth codeword counter] is less than or equal to a ninth threshold. A candidate position is reselected in response to the count value of [sixth codeword counter] being equal to the ninth threshold and the count value of [fourth valid codeword counter] being less than the tenth threshold. In response to the count value of [sixth codeword counter] being less than the ninth threshold and the count value of [fourth valid codeword counter] being less than the tenth threshold, {seventh codeword verification substate} is re-entered, and a next fifth test block selected based on the candidate position continues to be verified. When E is equal to 1, the ninth threshold is a quantity of fifth test blocks selected based on the candidate position. When E is greater than 1, the ninth threshold is E times the quantity of fifth test blocks selected based on the candidate position. When F is equal to 1, the tenth threshold is a quantity of fifth test blocks that satisfy the verification condition. When F is greater than 1, the tenth threshold is F times the quantity of fifth test blocks that satisfy the verification condition. The ninth threshold and the tenth threshold may be set based on an empirical value, or may be set based on a simulation analysis result.

Optionally, {synchronization position determining state} further includes {third codeword invalid substate}, and {third codeword invalid substate} is a state that is entered when a test block does not satisfy the verification condition. {third codeword invalid substate} is entered in response to the fifth test block not satisfying the verification condition. The count value of [sixth codeword counter] is increased by E in {third codeword invalid substate}. The candidate position is re-determined in response to the count value of [sixth codeword counter] being equal to the ninth threshold. In response to the count value of [sixth codeword counter] being less than the ninth threshold, {seventh codeword verification substate} is re-entered, and a next fifth test block selected based on the candidate position continues to be verified.

Optionally, a value of [fourth codeword valid variable] is set to a second value in response to the fifth test block satisfying the verification condition; and {fifth codeword valid substate} is entered in response to the value of [fourth codeword valid variable] being the second value.

A value of [fourth codeword valid variable] is set to a first value in response to the fifth test block not satisfying the verification condition; and {third codeword invalid substate} is entered in response to the value of [fourth codeword valid variable] being the first value.

Optionally, {synchronization position determining state} further includes {second restart substate}, and {second restart substate} is a state in which a signal for re-determining a candidate position is output. {second restart substate} is entered in {third codeword invalid substate} in response to the count value of [sixth codeword counter] being equal to the ninth threshold. Alternatively, {second restart substate} is entered in {fifth codeword valid substate} in response to the count value of [sixth codeword counter] being equal to the ninth threshold and the count value of [fourth valid codeword counter] being less than the tenth threshold. A value of [re-synchronization lock variable] is set to a second value in {second restart substate}. In response to the value of [re-synchronization lock variable] being set to the second value, it is determined that the start signal is detected, and a candidate position is reselected.

Optionally, {synchronization position determining state} further includes {fourth synchronization lock success substate}, and {fourth synchronization lock success substate} is a state in which synchronization is completed. {fourth synchronization lock success substate} is entered in response to the count value of [fourth valid codeword counter] being equal to the tenth threshold. A value of [fourth synchronization lock variable] is set to a second value in {fourth synchronization lock success substate}. That the value of [fourth synchronization lock variable] is the second value indicates that the candidate position is the synchronization position, and a second transition signal may be output through unconditional transition. The second transition signal is used to trigger to enter {loss-of-lock detection state}.

Optionally, a value of [fifth codeword to-be-verified variable] is set to a second value in response to selecting one fifth test block based on the candidate position, and {seventh codeword verification substate} is entered in response to the value of [fifth codeword to-be-verified variable] being the second value. Alternatively, {seventh codeword verification substate} is re-entered in response to the value of [fifth codeword to-be-verified variable] being the second value and the count value of [sixth codeword counter] being less than the ninth threshold. Alternatively, {seventh codeword verification substate} is re-entered in response to the value of [fifth codeword to-be-verified variable] being the second value, the count value of [sixth codeword counter] being less than the ninth threshold, and the count value of [fourth valid codeword counter] being less than the tenth threshold. A value of [fifth codeword to-be-verified variable] is set to a first value in {seventh codeword verification substate}.

In the state diagram shown in FIG. 15, {sixth counter reset substate} is represented as RESET_CNT_6, {seventh codeword verification substate} is represented as CW_CHECK_7, {fourth synchronization lock success substate} is represented as FEC_LOCK_GOOD_4, {fifth codeword valid substate} is represented as VALID_CW_5, {third codeword invalid substate} is represented as INVALID_CW_3, and {second restart substate} is represented as RESTART 2. [fourth synchronization lock variable] is represented as fec_cw_sync_4, [fifth codeword to-be-verified variable] is represented as test_cw_5, the count value of [sixth codeword counter] is represented as cw_cnt_6, the count value of [fourth valid codeword counter] is represented as valid_cw_cnt_4, [re-synchronization lock variable] is represented as restart_fec_lock, the value of [fourth codeword valid variable] corresponds to !valid_cw_4 when being the first value, and the value of [fourth codeword valid variable] corresponds to valid_cw_4 when being the second value.

In the state diagrams shown in FIG. 9 and FIG. 11 to FIG. 13, the test block selected based on the observation bit belongs to the first subsequence. In the state diagrams shown in FIG. 14 and FIG. 15, the test block selected based on the candidate position belongs to a third subsequence, both the first subsequence and the third subsequence belong to a receiving sequence, and the third subsequence is located after the first subsequence. In addition, the first subsequence and the third subsequence may alternatively partially overlap.

In another implementation, ninth-threshold fifth test blocks may be continuously selected based on the candidate position, the ninth-threshold fifth test blocks are traversed, and tenth-threshold fifth test blocks in the ninth-threshold fifth test blocks satisfy the verification condition, and the candidate position is determined as the synchronization position.

For example, in step 804, {loss-of-lock detection state} is entered to perform loss-of-lock detection. There are a plurality of manners of performing loss-of-lock detection. The following provides three feasible manners.

Manner 1: Verify, in {loss-of-lock detection state}, a plurality of codewords selected based on the synchronization position, and re-enter the synchronization position determining state in response to a quantity of codewords that do not satisfy the verification condition in the plurality of codewords reaching a specific value. For example, a target quantity of codewords are continuously selected based on the synchronization position; and if eighth-threshold codewords in the target quantity of codewords do not satisfy the verification condition, it is determined that the synchronization position is incorrect, and the synchronization position is updated; otherwise, it is determined that the synchronization position is correct. In a case in which the synchronization position is correct, a quantity of codewords that do not satisfy the verification condition is relatively small. Therefore, whether the quantity of codewords that do not satisfy the verification condition reaches the eighth threshold can be determined to more quickly determine whether the synchronization position is incorrect. Herein, the target quantity of codewords may be contiguous or non-contiguous in the data sequence.

Figure 16:
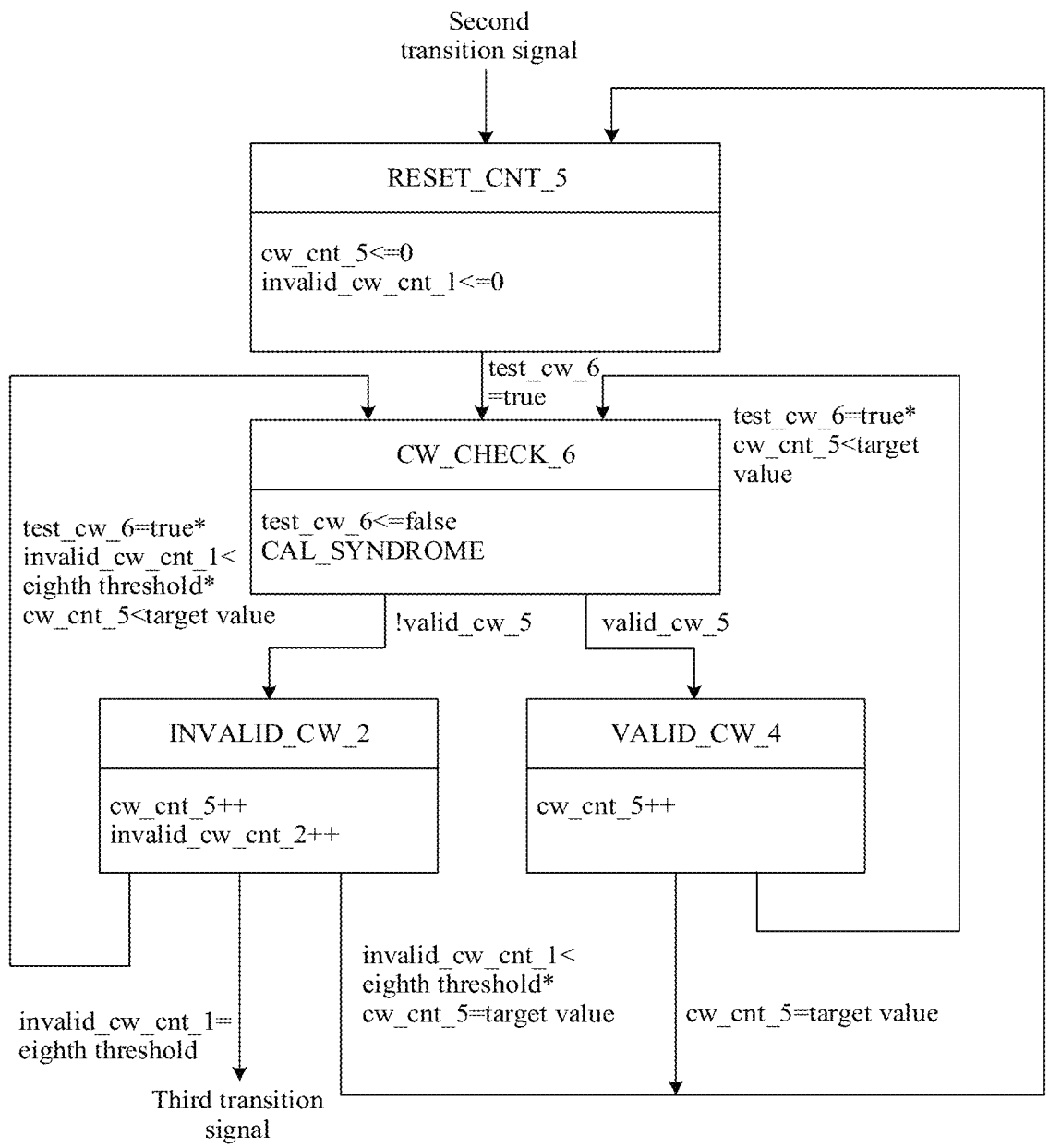
FIG. 16 is a state diagram of a loss-of-lock detection process according to an example embodiment of the present disclosure.

Specifically, referring to a state diagram shown in FIG. 16, {loss-of-lock detection state} includes {fifth counter reset substate} and {sixth codeword verification substate}, where {fifth counter reset substate} is a state in which a counter is reset, and {sixth codeword verification substate} is a state in which a codeword is verified.

{fifth counter reset substate} is entered after the synchronization position is determined. An initial value of [fifth codeword counter] and an initial value of [second invalid codeword counter] are set in {fifth counter reset substate}. Herein, both the initial values may be 0.

One codeword is selected from the data sequence based on the synchronization position. For ease of description, the codeword selected based on the synchronization position is referred to as a second codeword. Optionally, one codeword is selected from a fourth subsequence of the data sequence based on the synchronization position. The fourth subsequence is different from both the first subsequence and the third subsequence described above, and the fourth subsequence is located after the third subsequence.

{sixth codeword verification substate} is entered in response to selecting one second codeword. The second codeword is verified in {sixth codeword verification substate}. A verification manner of the second codeword is the same as the verification manner of the first codeword.

A count value of [fifth codeword counter] is increased by 1 and a count value of [second invalid codeword counter] is increased by 1 in response to the second codeword not satisfying the verification condition. Next verification is performed on the synchronization position in response to the count value of [fifth codeword counter] being equal to the target value and the count value of [second invalid codeword counter] being less than the eighth threshold. Herein, that the count value of [fifth codeword counter] is equal to the target value and the count value of [second invalid codeword counter] is less than the eighth threshold indicates that a quantity of codewords that do not satisfy the verification condition in the target quantity of codewords is relatively small, and the synchronization position is correct.

The synchronization position of the data sequence is re-determined in response to the count value of [second invalid codeword counter] being equal to the eighth threshold. Herein, that the count value of [second invalid codeword counter] is equal to the eighth threshold indicates that a quantity of codewords that do not satisfy the verification condition is relatively large, and the synchronization position is inaccurate.

Optionally, {loss-of-lock detection state} further includes {second codeword invalid substate}, and {second codeword invalid substate} is a state that is entered when a codeword does not satisfy the verification condition. {second codeword invalid substate} is entered in response to the second codeword not satisfying the verification condition. The count value of [fifth codeword counter] is increased by 1 and the count value of [second invalid codeword counter] is increased by 1 in {second codeword invalid substate}.

Optionally, in {second codeword invalid substate}, in response to the count value of [fifth codeword counter] being less than the target value and the count value of [first invalid codeword counter] being less than the eighth threshold, {sixth codeword verification substate} is re-entered, and the next second codeword selected based on the synchronization position is verified.

Optionally, {loss-of-lock detection state} further includes {fourth codeword valid substate}, and {fourth codeword valid substate} is a state that is entered when a codeword satisfies the verification condition. {fourth codeword valid substate} is entered in response to the second codeword satisfying the verification condition. The count value of [fifth codeword counter] is increased by 1 in {fourth codeword valid substate}. Next verification is performed on the synchronization position in response to the count value of [fifth codeword counter] being equal to the target value. A next second codeword selected based on the synchronization position is verified in response to the count value of [fifth codeword counter] being less than the target value.

Optionally, a value of [fifth codeword valid variable] is set to a second value in response to the second codeword satisfying the verification condition; and {fourth codeword valid substate} is entered in response to the value of [fifth codeword valid variable] being the second value.

A value of [fifth codeword valid variable] is set to a first value in response to the second codeword not satisfying the verification condition; and {second codeword invalid substate} is entered in response to the value of [fifth codeword valid variable] being the first value.

Optionally, a value of [sixth codeword to-be-verified variable] is set to a second value in response to selecting one second codeword based on the synchronization position, and {sixth codeword verification substate} is entered in response to the value of [sixth codeword to-be-verified variable] being the second value. Alternatively, {sixth codeword verification substate} is re-entered in {fourth codeword valid substate} in response to the value of [sixth codeword to-be-verified variable] being the second value and the count value of [fifth codeword counter] being less than the target value. Alternatively, in {second codeword invalid substate}, {sixth codeword verification substate} is re-entered in response to the value of [sixth codeword to-be-verified variable] being the second value, the count value of [fifth codeword counter] being less than the target value, and the count value of [second invalid codeword counter] being less than the eighth threshold. A value of [sixth codeword to-be-verified variable] is set to a first value in {sixth codeword verification substate}.

Optionally, {fifth counter reset substate} is entered in response to the value of [second synchronization lock parameter] being the second value. Alternatively, {fifth counter reset substate} is entered in response to the value of [third synchronization lock parameter] being the second value. {fifth counter reset substate} is entered in response to the value of [fourth synchronization lock parameter] being the second value. Alternatively, {fifth counter reset substate} is entered in response to a second transition signal, where the second transition signal is a signal that is output when position determining is completed.

Optionally, a third transition signal is output in response to the count value of [second invalid codeword counter] being equal to the eighth threshold, where the third transition signal indicates to re-determine the synchronization position of the data sequence.

Optionally, the loss-of-lock detection state further includes {third restart substate}, and {third restart substate} is a state in which a signal for re-determining a synchronization position is output. {third restart substate} is entered in response to the count value of [first invalid codeword counter] being equal to the eighth threshold. A value of [re-synchronization lock variable] is set to a second value in {third restart substate}. That the value of [re-synchronization lock variable] is the second value indicates that the synchronization position is re-determined.

In the state diagram shown in FIG. 16, {fifth counter reset substate} is represented as RESET_CNT_5, {sixth codeword verification substate} is represented as CW_CHECK_6, {fourth codeword valid substate} is represented as VALID_CW_4, and {second codeword invalid substate} is represented as INVALID_CW_2. [sixth codeword to-be-verified variable] is represented as test_cw_6, the count value of [fifth codeword counter] is represented as cw_cnt_5, the count value of [second invalid codeword counter] is represented as invalid_cw_cnt_2, [re-synchronization lock variable] is represented as restart_fec_lock, the value of [fifth codeword valid variable] corresponds to !valid_cw_5 when being the first value, and the value of [fifth codeword valid variable] corresponds to valid_cw_5 when being the second value.

Manner 2: Continuously select a target quantity of codewords based on the synchronization position; traverse the target quantity of codewords; and if eleventh-threshold codewords in the target quantity of codewords satisfy the verification condition, determine that the synchronization position is correct; otherwise, determine that the synchronization position is incorrect, where the eleventh threshold is greater than the eighth threshold.

Figure 17:
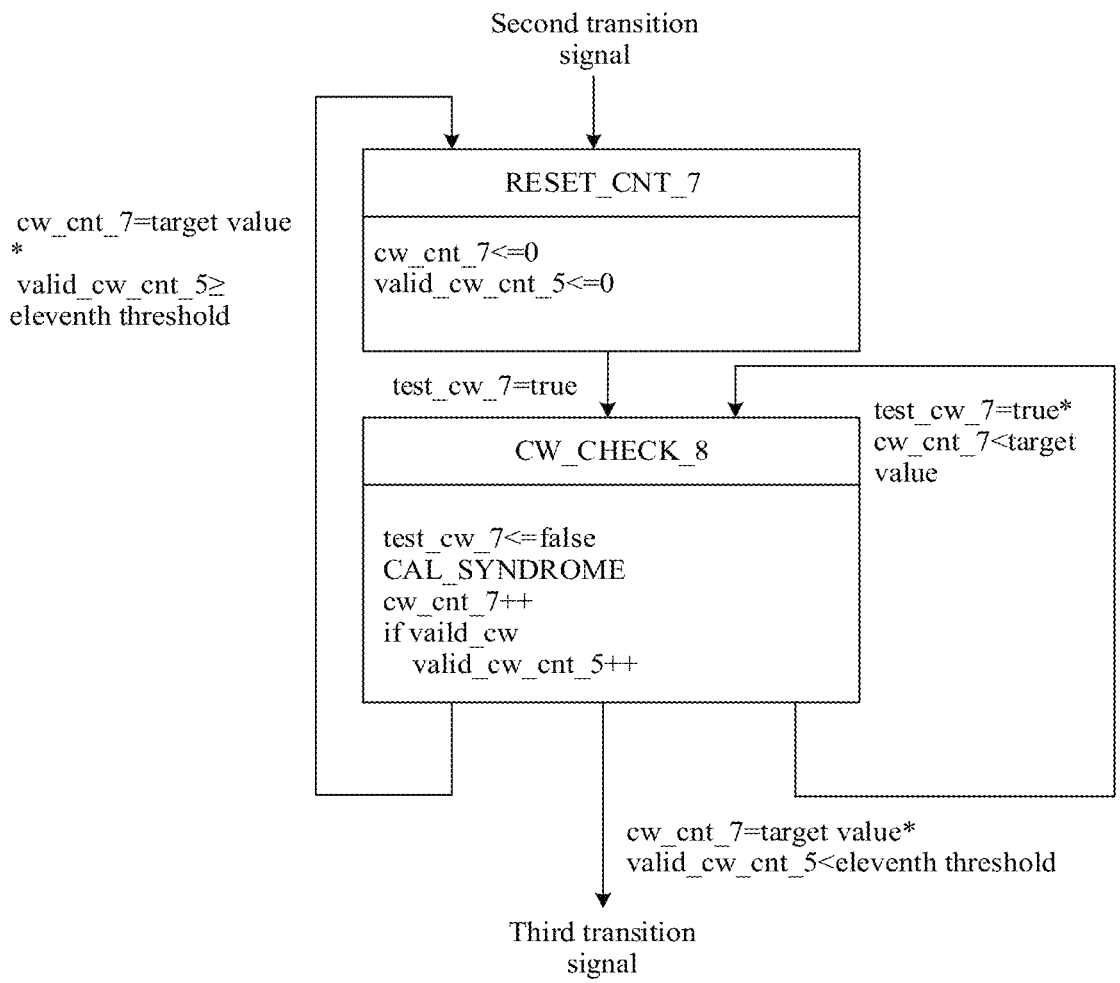
FIG. 17 is a state diagram of a loss-of-lock detection process according to an example embodiment of the present disclosure.

Specifically, referring to a state diagram shown in FIG. 17, {loss-of-lock detection state} includes {seventh counter reset substate} and {eighth codeword verification substate}, where {seventh counter reset substate} is a state in which a counter is reset, and {eighth codeword verification substate} is a state in which a codeword is verified.

{seventh counter reset substate} is entered after the synchronization position is determined. An initial value of [seventh codeword counter] and an initial value of [fifth valid codeword counter] are set in {seventh counter reset substate}. Herein, both the initial values may be 0.

One codeword is selected from the data sequence based on the synchronization position. For ease of description, the codeword selected based on the synchronization position is referred to as a second codeword. Optionally, one codeword is selected from a fourth subsequence of the data sequence based on the synchronization position. The fourth subsequence is different from both the first subsequence and the third subsequence described above, and the fourth subsequence is located after the third subsequence.

{eighth codeword verification substate} is entered in response to selecting one second codeword. In {eighth codeword verification substate}, the second codeword is verified, and the count value of [seventh codeword counter] is increased by 1. A verification manner of the second codeword is the same as the verification manner of the first test block.

The count value of [fifth valid codeword counter] is increased by 1 in {eighth codeword verification substate} in response to the second codeword satisfying the verification condition.

A next second codeword selected based on the synchronization position is verified in response to the count value of [seventh codeword counter] being less than the target value.

Next verification continues to be performed on the synchronization position in response to the count value of [seventh codeword counter] being equal to the target value and the count value of [fifth valid codeword counter] being greater than or equal to the eleventh threshold.

A third transition signal is output in response to the count value of [seventh codeword counter] being equal to the target value and the count value of [fifth valid codeword counter] being less than the eleventh threshold, where the third transition signal indicates to re-determine the synchronization position in the data sequence. Alternatively, the loss-of-lock detection state further includes {fourth restart substate}. {fourth restart substate} is re-entered in response to the count value of [seventh codeword counter] being equal to the target value and the count value of [fifth valid codeword counter] being less than the eleventh threshold. A value of [re-synchronization lock variable] is set to a second value in {fourth restart substate}. That the value of [re-synchronization lock variable] is the second value indicates that the synchronization position is re-determined.

Optionally, a value of [seventh codeword to-be-verified variable] is set to a second value (for example, true) in response to selecting one second codeword based on the synchronization position, and {eighth codeword verification substate} is entered in response to the value of [seventh codeword to-be-verified variable] being the second value. Alternatively, {eighth codeword verification substate} is re-entered in response to the value of [seventh codeword to-be-verified variable] being the second value and the count value of [seventh codeword counter] being less than the target value. A value of [seventh codeword to-be-verified variable] is set to a first value (for example, false) in {eighth codeword verification substate}.

In the state diagram shown in FIG. 17, {seventh counter reset substate} is represented as RESET_CNT_7, and {eighth codeword verification substate} is represented as CW_CHECK_8. [seventh codeword to-be-verified variable] is represented as test_cw_7, the count value of [seventh codeword counter] is represented as cw_cnt_7, the count value of [fifth valid codeword counter] is represented as valid_cw_cnt_5, that the second codeword satisfies the verification condition is represented as valid_cw, and "if" represents if.

Manner 3: Successively verify codewords selected based on the synchronization position, and determine a quantity of codewords that satisfy the verification condition, until a maximum quantity of codewords is a target value. In this process, when the quantity of codewords that satisfy the verification condition reaches the eleventh threshold, it is determined that the synchronization position is correct.

It should be noted that the foregoing synchronization position determining process and the loss-of-lock detection process may be combined in any manner. In addition, the foregoing synchronization position determining and loss-of-lock detection may be implemented by using a same state machine. Alternatively, two substate machines are used for implementation: substate machine 1 and substate machine 2. The substate machine 1 is used to implement the synchronization position determining process, and the substate machine 2 is used to implement the loss-of-lock detection process. Alternatively, three substate machines are used for implementation: substate machine 3, substate machine 4, and substate machine 5. The substate machine 3 is used to implement the candidate position determining process, the substate machine 4 is used to implement the synchronization position determining process, and the substate machine 5 is used to implement the loss-of-lock detection process.

Figure 18:
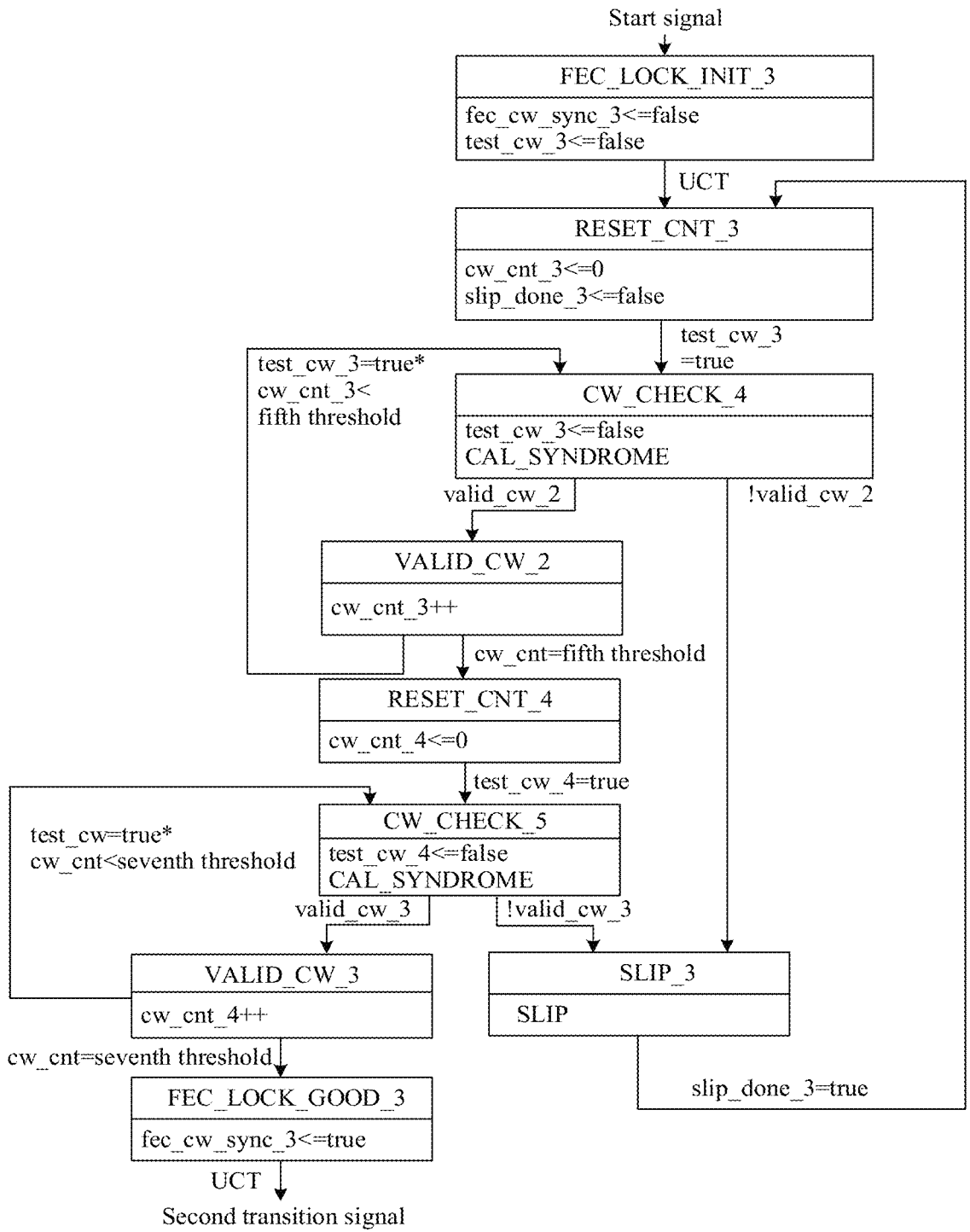
FIG. 18 is a state diagram of determining a candidate position according to an example embodiment of the present disclosure.

For example, FIG. 18 is a state diagram in which one state machine implements a synchronization position determining process. For the descriptions of the state diagram shown in FIG. 18, refer to the descriptions in the state diagrams shown in FIG. 13 and FIG. 14. Compared with FIG. 13 and FIG. 14, {third synchronization lock success substate} is added, which is represented as (FEC_LOCK_GOOD_3), and {first restart substate} is replaced with {third slip substate}.

It should be noted that, in the state diagram in this embodiment of the present disclosure, an example in which an added value of a register variable is 1 is used.

The following describes structures of codeword synchronization apparatuses.

Figure 19:
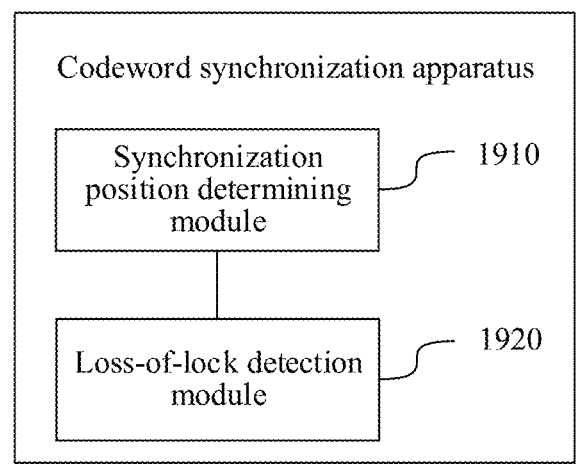
FIG. 19 is a diagram of a structure of a codeword synchronization apparatus according to an example embodiment of the present disclosure.

FIG. 19 is a diagram of a structure of a codeword synchronization apparatus according to an embodiment of the present disclosure. The apparatus may be implemented as a part or all of the apparatus through a combination of hardware. The apparatus provided in this embodiment of the present disclosure may implement the procedure in FIG. 8 in embodiments of the present disclosure. The apparatus includes a synchronization position determining module 1910 and a loss-of-lock detection module 1920.

The synchronization position determining module 1910 is configured to: enter a synchronization position determining state in response to a start signal; and determine a synchronization position in a received data sequence in the synchronization position determining state, where the synchronization position indicates a start position of a codeword in the data sequence, which may be specifically used to implement the synchronization position determining function in step 801 and step 802 and perform implicit steps included in step 801 and step 802.

The loss-of-lock detection module 1920 is configured to: enter a loss-of-lock detection state in response to determining the synchronization position; and verify, in the loss-of-lock detection state, a plurality of codewords selected based on the synchronization position, and re-enter the synchronization position determining state in response to a verification failure, which may be specifically used to implement the loss-of-lock detection function in step 803 and step 804 and perform implicit steps included in step 803 and step 804.

In a possible implementation, the synchronization position determining module 1910 is configured to: select N observation bits from the data sequence and determine the synchronization position based on positions of the N observation bits in the synchronization position determining state, where N is an integer greater than or equal to 1.

In a possible implementation, the synchronization position determining module 1910 is configured to: select the synchronization position from the positions of the N observation bits.

In a possible implementation, the synchronization position determining state includes a first counter reset substate and a first codeword verification substate.

The synchronization position determining module 1910 is configured to: set an initial value of a first codeword counter in the first counter reset substate, and select one observation bit from the data sequence; enter the first codeword verification substate in response to selecting one first test block from the data sequence based on the current observation bit, where a length of the first test block is equal to a codeword length, and a start position of the first test block and a position of the current observation bit are separated by an integer quantity of codeword lengths; verify the first test block in the first codeword verification substate; increase a count value of the first codeword counter by X in response to the first test block satisfying a verification condition, where X is an integer greater than or equal to 1; and determine the position of the current observation bit as the synchronization position in response to the count value of the first codeword counter being equal to a first threshold.

In a possible implementation, the synchronization position determining module 1910 is further configured to: in response to the count value of the first codeword counter being less than the first threshold, re-enter the first codeword verification substate, and verify a next first test block selected based on the current observation bit.

In a possible implementation, the synchronization position determining state further includes a first codeword valid substate.

The synchronization position determining module 1910 is further configured to: enter the first codeword valid substate in response to the first test block satisfying the verification condition; and increase the count value of the first codeword counter by X in the first codeword valid substate.

In a possible implementation, the synchronization position determining module 1910 is further configured to: verify, in response to the first test block not satisfying the verification condition, a next observation bit selected from the data sequence.

In a possible implementation, the synchronization position determining state further includes a first slip substate.

The synchronization position determining module 1910 is further configured to: enter the first slip substate in response to the first test block not satisfying the verification condition; slip to the next observation bit in the first slip substate; and in response to slipping to the next observation bit, re-enter the first counter reset substate, and verify the next observation bit.

In a possible implementation, the synchronization position determining state further includes a first synchronization lock initialization substate.

The synchronization position determining module 1910 is further configured to: before setting the initial value of the first codeword counter in the first counter reset substate, set a value of a first synchronization lock variable to a first value in the first synchronization lock initialization substate.

In a possible implementation, the synchronization position determining state further includes a first synchronization lock success substate.

The synchronization position determining module 1910 is further configured to: enter the first synchronization lock success substate in response to the count value of the first codeword counter being equal to the first threshold; and set the value of the first synchronization lock variable to a second value in the first synchronization lock success substate, where that the value of the first synchronization lock variable is the second value indicates that the position of the current observation bit is the synchronization position.

In a possible implementation, the synchronization position determining module 1910 is further configured to: set a value of a first codeword to-be-verified variable to a third value in the first synchronization lock initialization substate; and set the value of the first codeword to-be-verified variable to a fourth value in response to selecting the one first test block from the data sequence based on the current observation bit; and enter the first codeword verification substate in response to the value of the first codeword to-be-verified variable being the fourth value and the value of the first synchronization lock variable being the first value.

In a possible implementation, the loss-of-lock detection state includes a second codeword verification substate.

The loss-of-lock detection module 1920 is configured to: re-enter the first counter reset substate in response to determining the synchronization position; enter the second codeword verification substate in response to selecting one first codeword based on the synchronization position; and verify the first codeword in the second codeword verification substate.

In a possible implementation, the loss-of-lock detection module 1920 is further configured to: set the initial value of the first codeword counter and an initial value of a first invalid codeword counter in the first counter reset substate.

The loss-of-lock detection module 1920 is configured to: increase the count value of the first codeword counter by Y and increase a count value of the first invalid codeword counter by Z in response to the first codeword not satisfying the verification condition, where both Y and Z are integers greater than or equal to 1; and re-enter the synchronization position determining state in response to the count value of the first invalid codeword counter being equal to a third threshold in a case in which the count value of the first codeword counter is less than or equal to a second threshold, where the third threshold is less than the second threshold.

In a possible implementation, the synchronization position determining state includes the first slip substate.

The loss-of-lock detection module 1920 is configured to: enter the first slip substate; slip to the next observation bit in the first slip substate; and in response to slipping to the next observation bit, re-enter the first counter reset substate, and verify the next observation bit.

In a possible implementation, the synchronization position determining module 1910 is configured to: select a candidate position in the data sequence from the positions of the N observation bits; and determine the synchronization position based on the candidate position.

In a possible implementation, N is greater than 1, and the synchronization position determining state includes a second counter reset substate and a third codeword verification substate.

The synchronization position determining module 1910 is configured to: set an initial value of a second codeword counter and an initial value of a first currently-valid codeword counter in the second counter reset substate, and select one observation bit from the data sequence; enter the third codeword verification substate in response to selecting one second test block from the data sequence based on the current observation bit, where a length of the second test block is equal to a codeword length, and a start position of the second test block and a position of the current observation bit are separated by an integer quantity of codeword lengths; verify the second test block in the third codeword verification substate; increase a count value of the second codeword counter by W, where W is an integer greater than or equal to 1; and increase a count value of the first currently-valid codeword counter by P in response to the second test block satisfying a verification condition, where P is an integer greater than or equal to 1; increase a value of an observation bit quantity variable by 1 in response to the count value of the second codeword counter being equal to a fourth threshold, and in response to the count value of the first currently-valid codeword counter being greater than a current value of a maximum valid codeword quantity variable, update a value of a candidate synchronization position variable to the position of the current observation bit, and update the current value of the maximum valid codeword quantity variable to the count value of the first currently-valid codeword counter; and determine the value of the current candidate synchronization position variable as the candidate position in response to the value of the observation bit quantity variable being equal to N.

In a possible implementation, the synchronization position determining state further includes a candidate position selection substate.

The synchronization position determining module 1910 is configured to: enter the candidate position selection substate in response to the count value of the second codeword counter being equal to the fourth threshold; and in the candidate position selection substate, increase the value of the observation bit quantity variable by 1 in response to the count value of the second codeword counter being equal to the fourth threshold, and in response to the count value of the first currently-valid codeword counter being greater than the current value of the maximum valid codeword quantity variable, update the value of the candidate synchronization position variable to the position of the current observation bit, and update the current value of the maximum valid codeword quantity variable to the count value of the first currently-valid codeword counter.

In a possible implementation, the synchronization position determining module 1910 is further configured to: verify, in response to the value of the observation bit quantity variable being less than N, a next observation bit selected from the data sequence.

In a possible implementation, the synchronization position determining state further includes a second slip substate.

The synchronization position determining module 1910 is configured to: enter the second slip substate in response to the value of the observation bit quantity variable being less than N; slip to the next observation bit in the second slip substate; and in response to slipping to the next observation bit, re-enter the second counter reset substate, and verify the next observation bit.

In a possible implementation, the synchronization position determining state further includes a second synchronization lock initialization substate.

The synchronization position determining module 1910 is further configured to: in the second synchronization lock initialization substate, set the value of the observation bit quantity variable to a fifth value, set the value of the candidate synchronization position variable to a sixth value, and set the value of the maximum valid codeword quantity variable to a seventh value.

In a possible implementation, the synchronization position determining module 1910 is further configured to: set a value of a second codeword to-be-verified variable to a third value in the second synchronization lock initialization substate.

The synchronization position determining module 1910 is configured to: set the value of the second codeword to-be-verified variable to a fourth value in response to selecting the one second test block from the data sequence based on the current observation bit; and enter the third codeword verification substate in response to the value of the second codeword to-be-verified variable being the fourth value.

In a possible implementation, the synchronization position determining module 1910 is further configured to: in response to the count value of the second codeword counter being less than the fourth threshold, re-enter the third codeword verification substate, and verify a next second test block selected based on the current observation bit.

In a possible implementation, the synchronization position determining state includes a third counter reset substate and a fourth codeword verification substate.

The synchronization position determining module 1910 is configured to: set an initial value of a third codeword counter and an initial value of a first valid codeword counter in the third counter reset substate, and select one observation bit from the data sequence; enter the fourth codeword verification substate in response to selecting one third test block from the data sequence based on the current observation bit, where a length of the third test block is equal to a codeword length, and a start position of the third test block and a position of the current observation bit are separated by an integer quantity of codeword lengths; verify the third test block in the fourth codeword verification substate; increase a count value of the third codeword counter by M and increase a count value of the first valid codeword counter by Q in response to the third test block satisfying a verification condition, where both M and Q are integers greater than or equal to 1; and determine the position of the current observation bit as the candidate position in response to the count value of the first valid codeword counter being equal to a sixth threshold in a case in which the count value of the third codeword counter is less than or equal to a fifth threshold, where the fifth threshold is greater than or equal to the sixth threshold.

In a possible implementation, the synchronization position determining state further includes a second codeword valid substate.

The synchronization position determining module 1910 is configured to: enter the second codeword valid substate in response to the third test block satisfying the verification condition; and increase the count value of the third codeword counter by M and increase the count value of the first valid codeword counter by Q in the second codeword valid substate.

In a possible implementation, the synchronization position determining module 1910 is further configured to: in the second codeword valid substate, in response to the count value of the third codeword counter being equal to the fifth threshold and the count value of the first valid codeword counter being less than the sixth threshold, verify a next observation bit selected from the data sequence.

In a possible implementation, the synchronization position determining module 1910 is further configured to: in the second codeword valid substate, in response to the count value of the third codeword counter being less than the fifth threshold and the count value of the first valid codeword counter being less than the sixth threshold, re-enter the fourth codeword verification substate, and verify a next third test block selected based on the current observation bit.

In a possible implementation, the synchronization position determining state further includes a first codeword invalid substate.

The synchronization position determining module 1910 is further configured to: enter the first codeword invalid substate in response to the third test block not satisfying the verification condition; increase the count value of the third codeword counter by M in the first codeword invalid substate; and verify, in response to the count value of the third codeword counter being equal to the fifth threshold, the next observation bit selected from the data sequence.

In a possible implementation, the synchronization position determining module 1910 is further configured to: in the first codeword invalid substate, in response to the count value of the third codeword counter being less than the fifth threshold, re-enter the fourth codeword verification substate, and verify the next third test block selected based on the current observation bit.

In a possible implementation, the synchronization position determining state further includes a third slip substate.

The synchronization position determining module 1910 is configured to: enter the third slip substate; slip to the next observation bit in the third slip substate; and in response to slipping to the next observation bit, re-enter the third counter reset substate, and verify the next observation bit.

In a possible implementation, the synchronization position determining state further includes a third synchronization lock initialization substate.

The synchronization position determining module 1910 is further configured to: set a value of a third codeword to-be-verified variable to a third value in the third synchronization lock initialization substate.

In a possible implementation, the synchronization position determining module 1910 is configured to: set the value of the third codeword to-be-verified variable to a fourth value in response to selecting the one third test block from the data sequence based on the current observation bit; and enter the fourth codeword verification substate in response to the value of the third codeword to-be-verified variable being the fourth value.

In a possible implementation, the synchronization position determining module 1910 is configured to: verify the candidate position, and determine the candidate position as the synchronization position after the verification succeeds.

In a possible implementation, the synchronization position determining state further includes a fourth counter reset substate and a fifth codeword verification substate.

The synchronization position determining module 1910 is configured to: set an initial value of a fourth codeword counter in the fourth counter reset substate, and select one fourth test block from the data sequence based on the candidate position; enter the fifth codeword verification substate in response to selecting the one fourth test block from the data sequence based on the candidate position; verify the fourth test block in the fifth codeword verification substate; increase a count value of the fourth codeword counter by R in response to the fourth test block satisfying the verification condition, where R is an integer greater than or equal to 1; and determine the candidate position as the synchronization position in response to the count value of the fourth codeword counter being equal to a seventh threshold.

In a possible implementation, the synchronization position determining state further includes a third codeword valid substate.

The synchronization position determining module 1910 is configured to: enter the third codeword valid substate in response to the fourth test block satisfying the verification condition; and increase the count value of the fourth codeword counter by R in the third codeword valid substate.

In a possible implementation, the synchronization position determining module 1910 is further configured to:
  in response to the count value of the fourth codeword counter being less than the seventh threshold, re-enter the fifth codeword verification substate, and verify a next fourth test block selected based on the candidate position.

In a possible implementation, the synchronization position determining module 1910 is further configured to: reselect a candidate position in response to the fourth test block not satisfying the verification condition.

In a possible implementation, the synchronization position determining state further includes a first re-synchronization substate.

The synchronization position determining module 1910 is further configured to: enter the first re-synchronization substate in response to the fourth test block not satisfying the verification condition; and set a value of a first re-synchronization lock variable to a second value in the first re-synchronization substate, where that the value of the first re-synchronization lock variable is the second value indicates to re-select the candidate position in the data sequence.

In a possible implementation, the synchronization position determining state further includes a second synchronization lock success substate.

The synchronization position determining module 1910 is configured to: enter the second synchronization lock success substate in response to the count value of the fourth codeword counter being equal to the seventh threshold; and set a value of a second synchronization lock variable to the second value in the second synchronization lock success substate, where that the value of the second synchronization lock variable is the second value indicates that the candidate position is the synchronization position.

In a possible implementation, the synchronization position determining module 1910 is configured to: determine the candidate position as the synchronization position.

In a possible implementation, the loss-of-lock detection module 1920 is configured to: verify, in the loss-of-lock detection state, a codeword in a codeword set selected based on the synchronization position, where the codeword set includes a target quantity of codewords; and re-enter the synchronization position determining state in response to a quantity of codewords that do not satisfy the verification condition in the codeword set reaching an eighth threshold.

In a possible implementation, the loss-of-lock detection state includes a fifth counter reset substate and a sixth codeword verification substate.

The loss-of-lock detection module 1920 is configured to: set an initial value of a fifth codeword counter and an initial value of a second invalid codeword counter in the fifth counter reset substate; enter the sixth codeword verification substate in response to selecting one second codeword from the data sequence based on the synchronization position; verify the second codeword in the sixth codeword verification substate; increase a count value of the fifth codeword counter by 1 and increase a count value of the second invalid codeword counter by 1 in response to the second codeword not satisfying the verification condition; and re-enter the synchronization position determining state in response to the count value of the second invalid codeword counter being equal to the eighth threshold in a case in which the count value of the fifth codeword counter is less than a target value.

In a possible implementation, the loss-of-lock detection state further includes a second codeword invalid substate.

The loss-of-lock detection module 1920 is configured to: enter the second codeword invalid substate in response to the second codeword not satisfying the verification condition; and increase the count value of the fifth codeword counter by 1 and increase the count value of the second invalid codeword counter by 1 in the second codeword invalid substate.

In a possible implementation, the loss-of-lock detection module 1920 is further configured to: increase the count value of the fifth codeword counter by 1 in response to the second codeword satisfying the verification condition; and in response to the count value of the fifth codeword counter being equal to the target value, re-enter the fifth counter reset substate, and perform next verification on the synchronization position.

In a possible implementation, the loss-of-lock detection state further includes a fourth codeword valid substate.

The loss-of-lock detection module 1920 is further configured to: enter the fourth codeword valid substate in response to the second codeword satisfying the verification condition; and increase the count value of the fifth codeword counter by 1 in the fourth codeword valid substate.

In a possible implementation, the loss-of-lock detection module 1920 is further configured to: in the fourth codeword valid substate, in response to the count value of the fifth codeword counter being less than the target value, re-enter the sixth codeword verification substate, and verify a next second codeword selected based on the synchronization position.

In a possible implementation, the loss-of-lock detection module 1920 is further configured to: in the second codeword invalid substate, in response to the count value of the fifth codeword counter being less than the target value and the count value of the second invalid codeword counter being less than the eighth threshold, re-enter the sixth codeword verification substate, and verify the next second codeword selected based on the synchronization position.

In a possible implementation, the loss-of-lock detection module 1920 is further configured to: in the second codeword invalid substate, in response to the count value of the fifth codeword counter being equal to the target value and the count value of the second invalid codeword counter being less than the eighth threshold, re-enter the fifth counter reset substate, and perform next verification on the synchronization position.

In a possible implementation, the verification condition is that a quantity of zero elements in a syndrome of a test block or a codeword is greater than a synchronization threshold; or the verification condition is that a quantity of non-zero elements in a syndrome of a test block or a codeword is less than a non-synchronization threshold; or the verification condition is that a test block or a codeword is an error correction test block; or the verification condition is that a re-parity bit of a test block or a codeword is the same as an original parity bit.

In a possible implementation, the start signal includes a system reset signal, a system start signal, a data reception failure signal, or a re-synchronization signal.

In a possible implementation, the data sequence is a bit stream that is encoded through FEC.

The following describes a structure of a communication device.

Figure 20:
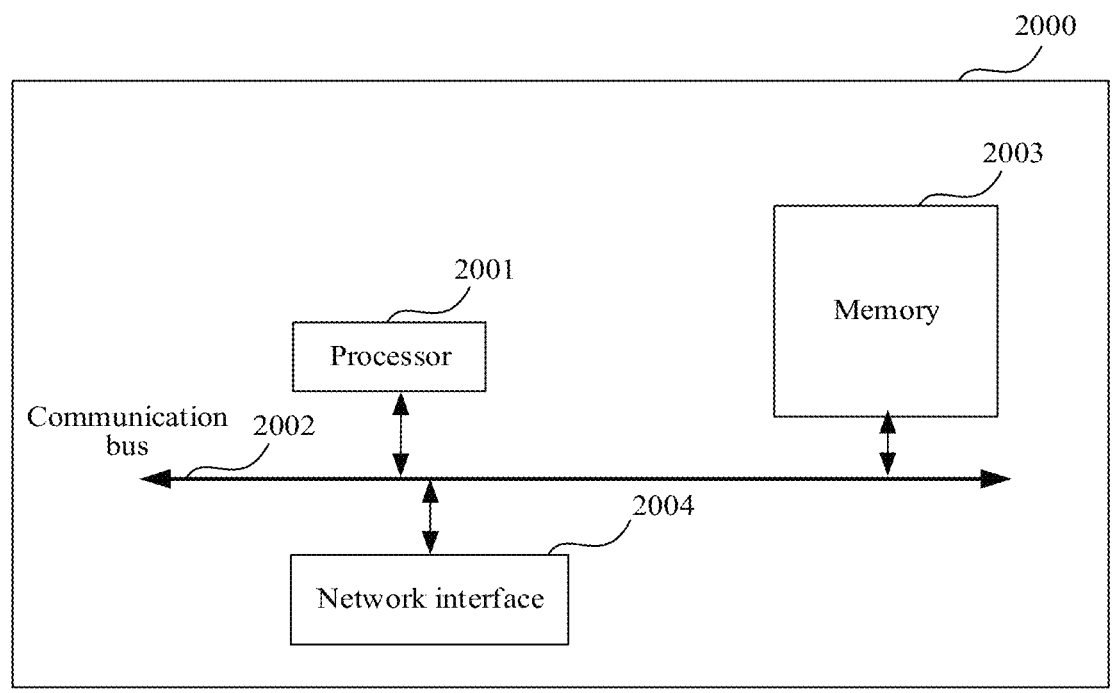
FIG. 20 is a diagram of a structure of a communication device according to an example embodiment of the present disclosure.

FIG. 20 is a diagram of a structure of a communication device according to an embodiment of the present disclosure. Referring to FIG. 20, the communication device 2000 is optionally implemented by using a general bus architecture. The communication device 2000 includes at least one processor 2001, a communication bus 2002, a memory 2003, and at least one network interface 2004. The communication device with the structure shown in FIG. 20 may be the router, the switch, or the like mentioned above.

The processor 2001 is, for example, a general-purpose central processing unit (CPU), a network processor (NP), a graphics processing unit (GPU), a neural network processing unit (NPU), a data processing unit (DPU), a microprocessor, or one or more integrated circuits configured to implement the solutions of the present disclosure. For example, the processor 2001 includes an ASIC, a programmable logic device (PLD), or a combination thereof. The PLD is, for example, a complex programmable logic device (CPLD), a field-programmable gate array (FPGA), a generic array logic (GAL), or any combination thereof.

The communication bus 2002 is configured to transfer information between the foregoing components. The communication bus 2002 may be classified into an address bus, a data bus, a control bus, or the like. For ease of representation, only one bold line represents the bus in FIG. 20, but this does not mean that there is only one bus or only one type of bus.

The memory 2003 is, for example, a read-only memory (ROM) or another type of static storage device that can store static information and instructions, for another example, a random-access memory (RAM) or another type of dynamic storage device that can store information and instructions, for another example, an electrically erasable programmable ROM (EEPROM), a compact disc ROM (CD-ROM) or other compact disk storage, an optical disk storage (including a compressed optical disc, a laser disc, an optical disc, a digital versatile disc, a Blu-ray disc, or the like), a magnetic disk storage medium or another magnetic storage device, or any other medium that can be used to carry or store desired program code in a form of an instruction or a data structure and that can be accessed by a computer. However, this is not limited thereto. The memory 2003, for example, exists independently, and is connected to the processor 2001 through the communication bus 2002. Alternatively, the memory 2003 and the processor 2001 may be integrated together.

The network interface 2004 is any apparatus of a transceiver type and is configured to communicate with another device or a communication network. The network interface 2004 includes a wired network interface, or may include a wireless network interface. The wired network interface may be, for example, an Ethernet interface. The Ethernet interface may be an optical interface, an electrical interface, or a combination thereof. The wireless network interface may be a wireless local area network (WLAN) interface, a network interface of a cellular network, a combination thereof, or the like.

During specific implementation, in an example, the processor 2001 may include one or more CPUs.

During specific implementation, in an example, the communication device 2000 may include a plurality of processors. Each of the processors may be a single-core processor (single-CPU), or may be a multi-core processor (multi-CPU). The processor herein may be one or more devices, circuits, and/or processing cores configured to process data (for example, computer program instructions).

Figure 21:
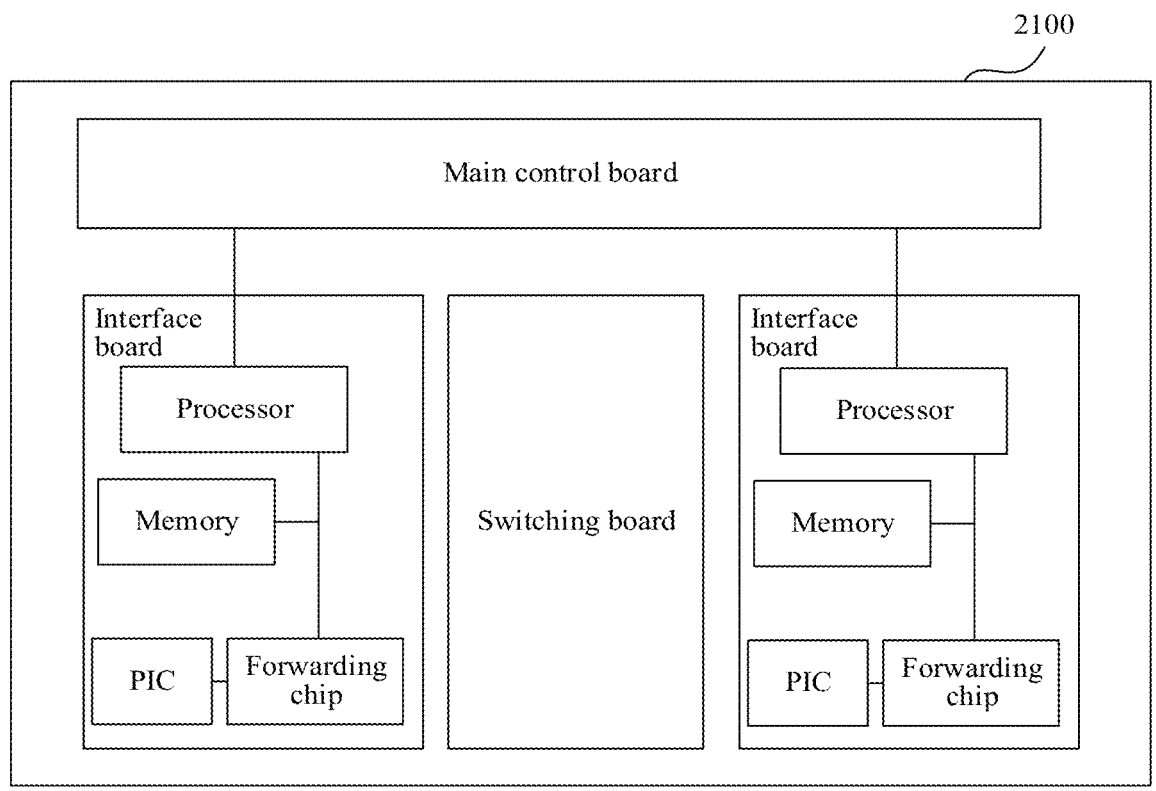
FIG. 21 is a diagram of a structure of a communication device according to an example embodiment of the present disclosure.

FIG. 21 is a diagram of another structure of a communication device according to an embodiment of the present disclosure. When the communication device is a forwarding device on a network, for example, a router or a switch, for the communication device, refer to the diagram of the device structure shown in FIG. 21. The device 2100 includes a main control board and one or more interface boards. The main control board is communicatively connected to the interface boards. The main control board is also referred to as a main processing unit (MPU) or a route processor card. The main control board is responsible for controlling and managing each component in the device 2100, including route calculation, device management, and function maintenance. The interface board is also referred to as a line processing unit (LPU) or a line card, and is configured to forward data.

In some embodiments, the device 2100 may also include a switching board. The switching board is communicatively connected to the main control board and the interface boards. The switching board is configured to forward data between the interface boards. The switching board may also be referred to as a switch fabric unit (SFU). The interface board includes a central processing unit, a memory, a forwarding chip, and a physical interface card (PIC). The central processing unit is communicatively connected to the memory, a network processor, and the physical interface card. The memory is configured to store a forwarding table. The forwarding chip is configured to forward a received data frame based on the forwarding table stored in the memory. If a destination address of the data frame is an address of the device 2100, the data frame is sent to the CPU for processing. If a destination address of the data frame is not an address of the device 2100, a next hop and an outbound interface that correspond to the destination address are found in the forwarding table based on the destination address, and the data frame is forwarded to the outbound interface corresponding to the destination address. The forwarding chip may be an NP. The PIC is also referred to as a subcard, and may be mounted on the interface board and responsible for converting an optical or electrical signal into a data frame, checking validity of the data frame, and then forwarding the data frame to the forwarding chip for processing.

In some embodiments, the central processing unit may also perform a function of a forwarding chip, for example, implement software forwarding based on a general-purpose CPU, so that no forwarding chip is required in the interface board. A communication connection between the main control board, the interface board, and the switching board may be implemented through a bus. In some embodiments, the forwarding chip may be implemented through an ASIC or an FPGA.

Logically, the device 2100 includes a control plane and a forwarding plane. The control plane includes the main control board and the central processing unit. The forwarding plane includes components for performing forwarding, for example, the memory, the PIC, and the NP. The control plane performs functions such as a function of a router, generating a forwarding table, processing signaling and a protocol packet, and configuring and maintaining a status of PE1. The control plane delivers the generated forwarding table to the forwarding plane. On the forwarding plane, the NP searches a table based on the forwarding table delivered by the control plane to forward a packet received by the PIC of the device 2100. The forwarding table delivered by the control plane may be stored in the memory. In some embodiments, the control plane and the forwarding plane may be completely separated, and are not on a same device.

In a specific embodiment, the interface board is configured to receive a data sequence, where the data sequence includes a plurality of bits.

The main control board is configured to: determine a synchronization position in a data sequence, where the synchronization position indicates a start position of a codeword in the data sequence; and perform loss-of-lock detection. For a detailed processing process, refer to the descriptions in FIG. 8.

In a possible implementation, an interprocess communication (IPC) channel is established between the main control board and the interface board, and the main control board and the interface board communicate with each other through the IPC channel.

An embodiment of the present disclosure further provides a chip, and the chip is configured to implement the foregoing codeword synchronization method.

An embodiment of the present disclosure further provides a chip system. The chip system includes a first chip and a second chip that are cascaded. The first chip is configured to implement the foregoing codeword synchronization method. The second chip is configured to perform codeword synchronization based on an AM mode. In other words, the codeword synchronization method in the present disclosure is used for inner FEC, and the codeword synchronization method based on the AM mode is used for outer FEC.

In several embodiments provided in the present disclosure, it should be understood that the disclosed system architecture, apparatus, and method may be implemented in other manners. For example, the described apparatus embodiment is merely an example. For example, division into the modules is merely logical function division and may be other division during actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

In the present disclosure, terms such as "first" and "second" are used to distinguish between same items or similar items that have basically same purposes or functions. It should be understood that there is no logical or time sequence dependency between "first" and "second", and a quantity and an execution sequence are not limited. It should be further understood that although the following descriptions use terms such as "first" and "second" to describe various elements, these elements should not be limited by the terms. These terms are simply used to distinguish one element from another element. For example, without departing from the scope of the various examples, a first test block may be referred to as a second test block, and similarly, the second test block may be referred to as the first test block. Both the first test block and the second test block may be test blocks, and may be separate and different test blocks in some cases.

A term "at least one" in the present disclosure means one or more, and a term "a plurality of" in the present disclosure means two or more.

The foregoing descriptions are merely example implementations of the present disclosure, but are not intended to limit the protection scope of this application. Any equivalent modification or replacement readily figured out by a person skilled in the art within the technical scope disclosed in the present disclosure shall fall within the protection scope of this application. Therefore, the protection scope of this application shall be subject to the protection scope of the claims.

What is claimed is:

1. A method comprising:
    receiving a data sequence;
    entering a synchronization position determining state in response to a start signal, wherein the synchronization position determining state comprises a first codeword verification substate;
    selecting a candidate position in the data sequence while in the synchronization position determining state;
    entering the first codeword verification substate;
    increasing, after entering the first codeword verification substate, a first count value of a first codeword counter by E, wherein E is a first integer greater than 0;
    increasing, when a first test block satisfies a verification condition and after entering the first codeword verification substate, a second count value of a first valid codeword counter by F, wherein F is a second integer greater than 0, and wherein the first test block is based on the candidate position; and
    determining, when the first count value is less than or equal to a first threshold and the second count value is equal to a second threshold, the candidate position as a synchronization position in the data sequence, wherein the synchronization position indicates a start position of a codeword in the data sequence.

2. The method of claim 1, further comprising determining whether the first test block satisfies the verification condition based on a characteristic value of the first test block.

3. The method of claim 2, wherein the characteristic value comprises a syndrome.

4. The method of claim 3, further comprising determining that the first test block satisfies the verification condition when the syndrome is a zero vector.

5. The method of claim 1, further comprising:
    re-entering, when the first count value is less than the first threshold and the second count value is less than the second threshold, the first codeword verification substate; and
    verifying a next test block, wherein the next test block is based on the candidate position.

6. The method of claim 1, further comprising reselecting, when the first count value is equal to the first threshold and the second count value is less than the second threshold, the candidate position.

7. The method of claim 1, further comprising:
    entering a counter reset substate of the synchronization position determining state; and
    setting, after entering the sixth counter reset substate, a first initial value of the first codeword counter and a second initial value of the first valid codeword counter.

8. The method of claim 1, wherein selecting the candidate position comprises:
    selecting N observation bits from the data sequence; and
    selecting, in the synchronization position determining state, the synchronization position from positions of the N observation bits wherein N is a third integer greater than 0.

9. The method of claim 8, wherein selecting the candidate position further comprises:
    entering a second codeword verification substate of the synchronization position determining state;
    increasing, after entering the second fourth-codeword verification substate, third count value of a second codeword counter by M, wherein M is a fourth integer greater than 0;
    increasing, after entering the second codeword verification substate and when a second test block satisfies a verification condition, a fourth count value of a second valid codeword counter by Q, wherein Q is a fifth integer greater than 0, and wherein the second test block is based on a current observation bit; and
    determining, when the third count value is less than or equal to a third threshold and the fourth count value is equal to a fourth threshold, a position of the current observation bit as the candidate position.

10. The method of claim 9, wherein selecting the candidate position further comprises:
    re-entering, when the third count value is less than the third fifth threshold and the fourth count value is less than the fourth threshold, the second codeword verification substate; and
    verifying a next test block, wherein the next test block is based on the current observation bit.

11. The method of claim 9, wherein selecting the candidate position further comprises:
    verifying, when the third count value is equal to the third threshold and the fourth count value is than the fourth threshold, a next observation bit from the data sequence.

12. The method of claim 11, further comprising:
    entering a counter reset substate, of the synchronization position determining state; and
    setting a first initial value of the second codeword counter and a second initial value of the second valid codeword counter.

13. The method of claim 12, wherein verifying the next observation bit comprises:
    entering a slip substate of the synchronization position determining state;
    slipping, after entering the slip substate, to the next observation bit;
    re-entering, in response to slipping to the next observation bit, the counter reset substate; and
    verifying the next observation bit.

14. The method of claim 9, wherein the first test block belongs to a first subsequence in the data sequence, wherein the second test block belongs to a second subsequence in the data sequence, and wherein the second subsequence is located after the first subsequence.

15. The method of claim 1, wherein the start signal comprises a system reset signal, a system start signal, a data reception failure signal, or a re-synchronization signal.

16. A device comprising:
a memory configured to store instructions; and
one or more processors coupled to the memory and configured to execute the instructions to cause the device to:
receive a data sequence;
enter a synchronization position determining state in response to a start signal, wherein the synchronization position determining state comprises a first codeword verification substate;
select a candidate position in the data sequence while in the synchronization position determining state;
enter the first codeword verification substate;
increase, after entering the first codeword verification substate, a first count value of a first codeword counter by E, wherein E is a first integer greater than 0;
increase, when a first test block satisfies a verification condition and after entering the first codeword verification substate, increase a second count value of a first valid codeword counter by F, wherein F is a second integer greater than 0, and wherein the first test block is based on the candidate position; and
determine, when the first count value is less than or equal to a first threshold and the second count value is equal to a second threshold, the candidate position as a synchronization position in the data sequence, wherein the synchronization position indicates a start position of a codeword in the data sequence.

17. The device of claim 16, wherein the one or more processors are further configured to execute the instructions to cause the device to determine whether the first test block satisfies the verification condition based on a characteristic value of the first test block.

18. The device of claim 17, wherein the characteristic value comprises a syndrome.

19. The device of claim 18, wherein the one or more processors are further configured to execute the instructions to cause the device is to determine that the first test block satisfies the verification condition when the syndrome is a zero vector.

20. The device of claim 16, wherein the one or more processors are further configured to execute the instructions to cause the device to:
re-enter, when the first count value is less than the first threshold and the second count value is less than the second threshold, the first codeword verification substate; and
verify a next test block, wherein the next test block is based on the candidate position.

21. The device of claim 16, wherein the one or more processors are further configured to execute the instructions to cause the device to reselect, when the first count value is equal to the first threshold and the second count value is less than the second threshold, the candidate position.

22. The device of claim 16, wherein the one or more processors are further configured to execute the instructions to cause the device to:
enter a first counter reset substate of the synchronization position determining state; and
set, after entering the first counter reset substate, a first initial value of the first codeword counter and a second initial value of the first valid codeword counter.

23. The device of claim 16, wherein the one or more processors are further configured to execute the instructions to cause the device to:
select N observation bits from the data sequence; and
select, in the synchronization position determining state, the synchronization position from positions of the N observation bits, wherein N is a third integer greater than 0.

24. The device of claim 23, wherein the one or more processors are further configured to execute the instructions to cause the device to:
enter a second codeword verification substate of the synchronization position determining state;
increase, after entering the second codeword verification substate, a third count value of a second codeword counter by M, wherein M is a fourth integer greater than 0;
increase, after entering the second codeword verification substate and when a second test block satisfies a verification condition, a fourth count value of a second valid codeword counter by Q, wherein Q is a fifth integer greater than 0, and wherein the second test block is based on a current observation bit; and
determine, when the third count value is less than or equal to a third threshold and the fourth count value is equal to a fourth threshold, a position of the current observation bit as the candidate position.

25. The device of claim 24, wherein the one or more processors are further configured to execute the instructions to cause the device is to:
re-enter, when the third count value is less than the third threshold and the fourth count value is less than the fourth threshold, the second codeword verification substate; and
verify a next test block, wherein the next test block is based on the current observation bit.

26. The device of claim 24, wherein the one or more processors are further configured to execute the instructions to cause the device to:
verify, when the third count value is equal to the third threshold and the fourth count value is less than the fourth threshold, a next observation bit from the data sequence.

27. The device of claim 26, wherein the one or more processors are further configured to execute the instructions to cause the device to:
enter a counter reset substate of the synchronization position determining state; and
set, after entering the counter reset substate, a first initial value of the second codeword counter and a second initial value of the second valid codeword counter.

28. The device of claim 27, wherein the one or more processors are further configured to execute the instructions to cause the device to:
enter a slip substate of the synchronization position determining state;
slip, after entering the slip substate, to the next observation bit;
re-enter, in response to slipping to the next observation bit, the counter reset substate; and
verify the next observation bit.

29. The device of claim 24, wherein the first test block belongs to a first subsequence in the data sequence, wherein the second test block belongs to a second subsequence in the data sequence, and wherein the second subsequence is located after the first subsequence.

30. The device of claim 16, wherein the start signal comprises a system reset signal, a system start signal, a data reception failure signal, or a re-synchronization signal.

31. A chip system comprising:
a first chip configured to:
  receive a data sequence;
  enter a synchronization position determining state in response to a start signal, wherein the synchronization position determining state comprises a first codeword verification substate;
  select a candidate position in the data sequence while in the synchronization position determining state;
  enter the first codeword verification substate;
  increase, after entering the first codeword verification substate, a first count value of a first codeword counter by E, wherein E is a first integer greater than 0;
  increase, when a first test block satisfies a verification condition and after entering the first codeword verification substate, increase a second count value of a first valid codeword counter by F, wherein is a second integer greater than 0, and wherein the first test block is based on the candidate position; and
  determine, when the first count value is less than or equal to a first threshold and the second count value is equal to a second threshold, the candidate position as a synchronization position in the data sequence, wherein the synchronization position indicates a start position of a codeword in the data sequence; and
a second chip configured to perform codeword synchronization in an alignment marker (AM) manner, wherein the first chip and the second chip are cascaded.

* * * * *